(12) United States Patent
Quan

(10) Patent No.: US 8,280,049 B2
(45) Date of Patent: *Oct. 2, 2012

(54) METHOD AND APPARATUS FOR SYNTHESIZING COPY PROTECTION FOR REDUCING/DEFEATING THE EFFECTIVENESS OR CAPABILITY OF A CIRCUMVENTION DEVICE

(75) Inventor: Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 12/322,004

(22) Filed: Jan. 28, 2009

(65) Prior Publication Data
US 2010/0054469 A1   Mar. 4, 2010

(51) Int. Cl.
*H04N 7/167* (2011.01)
*H04N 9/80* (2006.01)

(52) U.S. Cl. .......................... 380/204; 380/203; 386/252
(58) Field of Classification Search .......... 380/203–204; 386/252
See application file for complete search history.

(56) References Cited

U.S. PATENT DOCUMENTS

| | | | | |
|---|---|---|---|---|
| 4,631,603 A * | 12/1986 | Ryan | .............................. | 386/201 |
| 4,695,901 A * | 9/1987 | Ryan | .............................. | 380/204 |
| 4,907,093 A * | 3/1990 | Ryan | .............................. | 386/245 |
| 5,194,965 A * | 3/1993 | Quan et al. | .................... | 386/245 |
| 5,251,041 A * | 10/1993 | Young et al. | .................. | 386/306 |
| 5,315,448 A | 5/1994 | Ryan | | |
| 5,394,470 A * | 2/1995 | Buynak et al. | ................. | 380/204 |
| 5,479,268 A | 12/1995 | Young et al. | | |
| 5,579,120 A * | 11/1996 | Oguro | ........................... | 386/252 |
| 5,583,936 A * | 12/1996 | Wonfor et al. | ................ | 380/204 |
| 5,625,691 A * | 4/1997 | Quan | ............................. | 380/204 |
| 5,633,927 A * | 5/1997 | Ryan et al. | ..................... | 380/204 |
| 5,651,065 A * | 7/1997 | Stufflet et al. | ................. | 380/213 |
| 5,661,801 A * | 8/1997 | Sperber | ......................... | 380/204 |
| 5,748,733 A * | 5/1998 | Quan | ............................. | 380/204 |
| 5,907,656 A * | 5/1999 | Oguro | ........................... | 386/245 |
| 5,953,417 A * | 9/1999 | Quan | ............................. | 380/203 |

(Continued)

FOREIGN PATENT DOCUMENTS

KR   2002/0078344 A   10/2002

OTHER PUBLICATIONS

International Search Report for International application No. PCT/US2009/004730, mailed Apr. 12, 2010, 1 page.

*Primary Examiner* — Christian LaForgia
(74) *Attorney, Agent, or Firm* — George B. Almeida

(57) ABSTRACT

A new copy protection signal includes resistance to certain circumvention devices and includes improved playability. The new copy protection signal causes the certain circumvention devices to pass substantially the copy protection effects to a video recorder or to allow for content control effectiveness on a compliant device. The new copy protection signal also causes the circumvention device to add or enhance copy protection effectiveness, which is contrary to the circumvention device's original intent of removing or reducing copy protection effectiveness. The new copy protection signal is provided by inserting or adding one or more pseudo sync pulses or one or more pseudo sync/AGC pulse pairs immediately after, or one line after, a vertical sync signal in at least one television line.

22 Claims, 10 Drawing Sheets

U.S. PATENT DOCUMENTS

| | | | |
|---|---|---|---|
| 6,002,830 A * | 12/1999 | Quan | 386/255 |
| 6,028,941 A * | 2/2000 | Kemplin | 380/224 |
| 6,058,191 A * | 5/2000 | Quan | 380/203 |
| 6,173,109 B1 * | 1/2001 | Quan | 386/257 |
| 6,285,765 B1 | 9/2001 | Quan | |
| 6,381,747 B1 | 4/2002 | Wonfor et al. | |
| 6,421,497 B1 * | 7/2002 | Quan | 386/245 |
| 6,501,842 B2 * | 12/2002 | Quan | 380/221 |
| 6,516,132 B1 | 2/2003 | Wrobleski et al. | |
| 6,690,880 B1 * | 2/2004 | Rinaldi | 386/252 |
| 6,836,549 B1 * | 12/2004 | Quan et al. | 380/221 |
| 6,839,433 B1 * | 1/2005 | Quan | 380/206 |
| 6,931,547 B2 * | 8/2005 | Quan | 386/245 |
| 7,039,294 B2 | 5/2006 | Quan | |
| 7,050,698 B1 * | 5/2006 | Quan | 386/254 |
| 7,085,380 B2 * | 8/2006 | Quan | 380/204 |
| 7,100,209 B2 * | 8/2006 | Quan | 726/32 |
| 7,352,863 B2 * | 4/2008 | Quan | 380/201 |
| 7,352,864 B2 * | 4/2008 | Kaise | 380/205 |
| 7,395,545 B2 | 7/2008 | Wonfor et al. | |
| 7,492,896 B2 * | 2/2009 | Quan | 380/221 |
| RE40,689 E * | 3/2009 | Quan et al. | 386/252 |
| 7,603,025 B2 * | 10/2009 | Rinaldi | 386/252 |
| 7,620,178 B2 | 11/2009 | Wonfor et al. | |
| 7,706,533 B2 | 4/2010 | Quan | |
| 8,019,201 B2 * | 9/2011 | Tan et al. | 386/307 |
| 8,094,818 B2 * | 1/2012 | Quan | 380/221 |
| 2003/0149980 A1 | 8/2003 | Hassell et al. | |
| 2004/0174798 A1 | 9/2004 | Riguidel et al. | |
| 2005/0117749 A1 * | 6/2005 | Quan | 380/201 |
| 2006/0056809 A1 * | 3/2006 | Quan | 386/94 |
| 2006/0083373 A1 | 4/2006 | Ryan et al. | |
| 2006/0085863 A1 | 4/2006 | Ryan et al. | |
| 2006/0251252 A1 | 11/2006 | Quan | |
| 2007/0206794 A1 * | 9/2007 | Wonfor et al. | 380/203 |
| 2008/0025696 A1 | 1/2008 | Wonfor et al. | |
| 2008/0100597 A1 | 5/2008 | Quan | |
| 2008/0178235 A1 | 7/2008 | Wonfor et al. | |
| 2009/0052866 A1 * | 2/2009 | Quan | 386/94 |
| 2009/0327717 A1 | 12/2009 | Jin et al. | |
| 2010/0021133 A1 | 1/2010 | Wonfor et al. | |
| 2010/0054700 A1 * | 3/2010 | Quan | 386/94 |
| 2010/0107201 A1 | 4/2010 | Hannum et al. | |
| 2011/0135277 A1 * | 6/2011 | Quan | 386/256 |
| 2011/0225603 A1 | 9/2011 | Amento et al. | |

\* cited by examiner

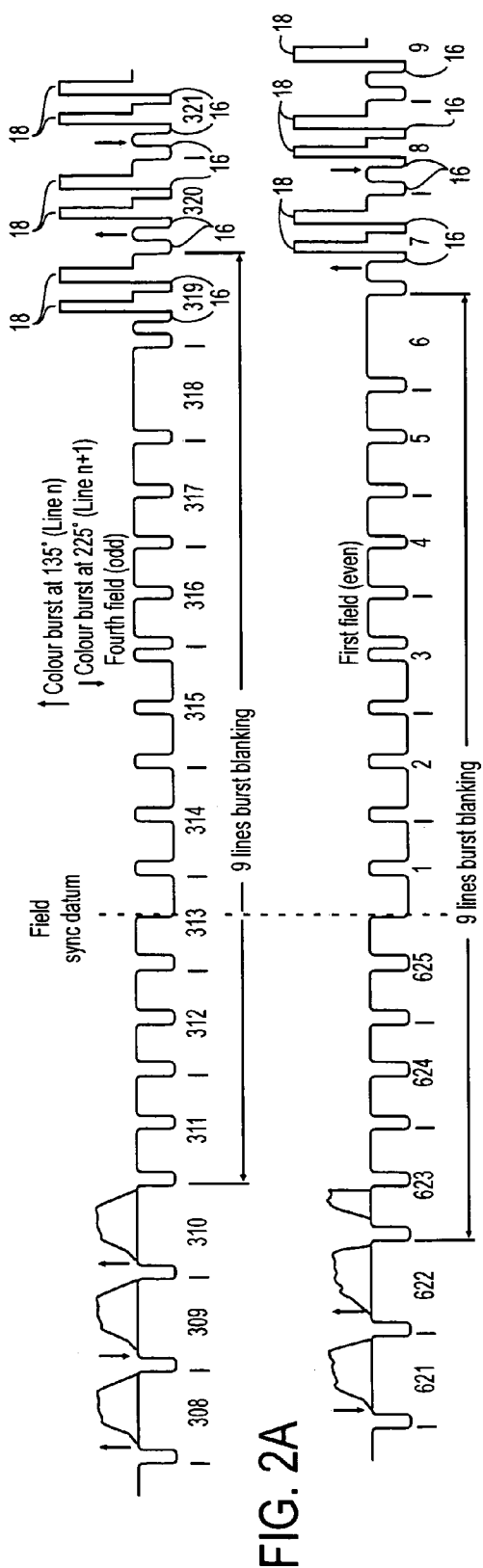
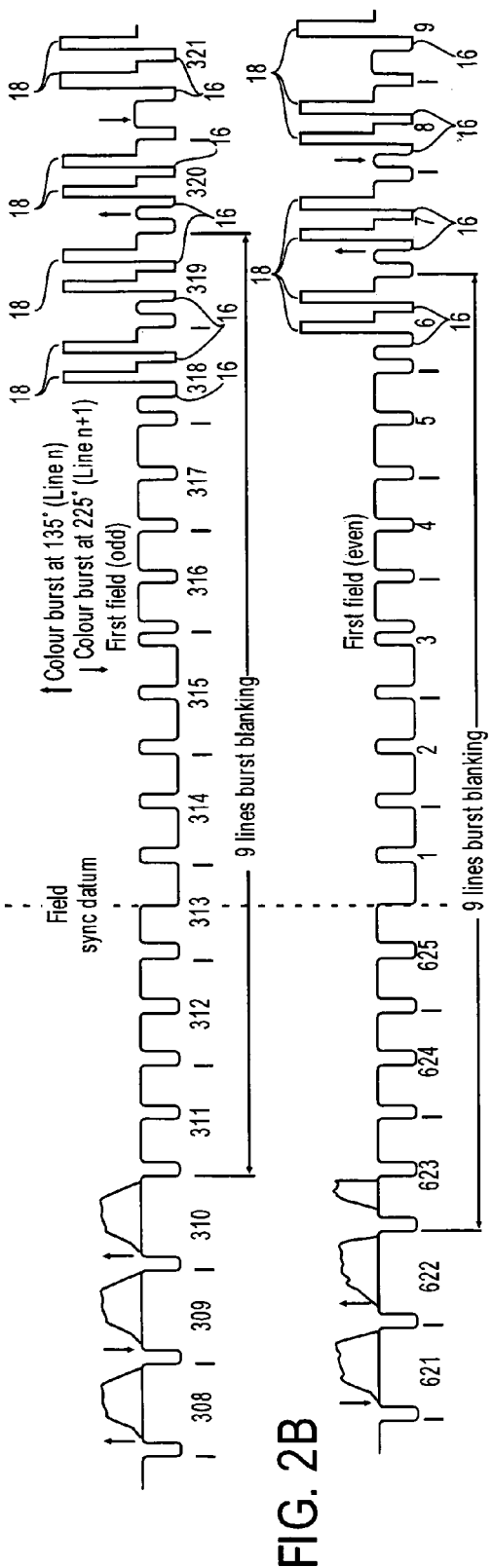
FIG. 2A
FIG. 2B

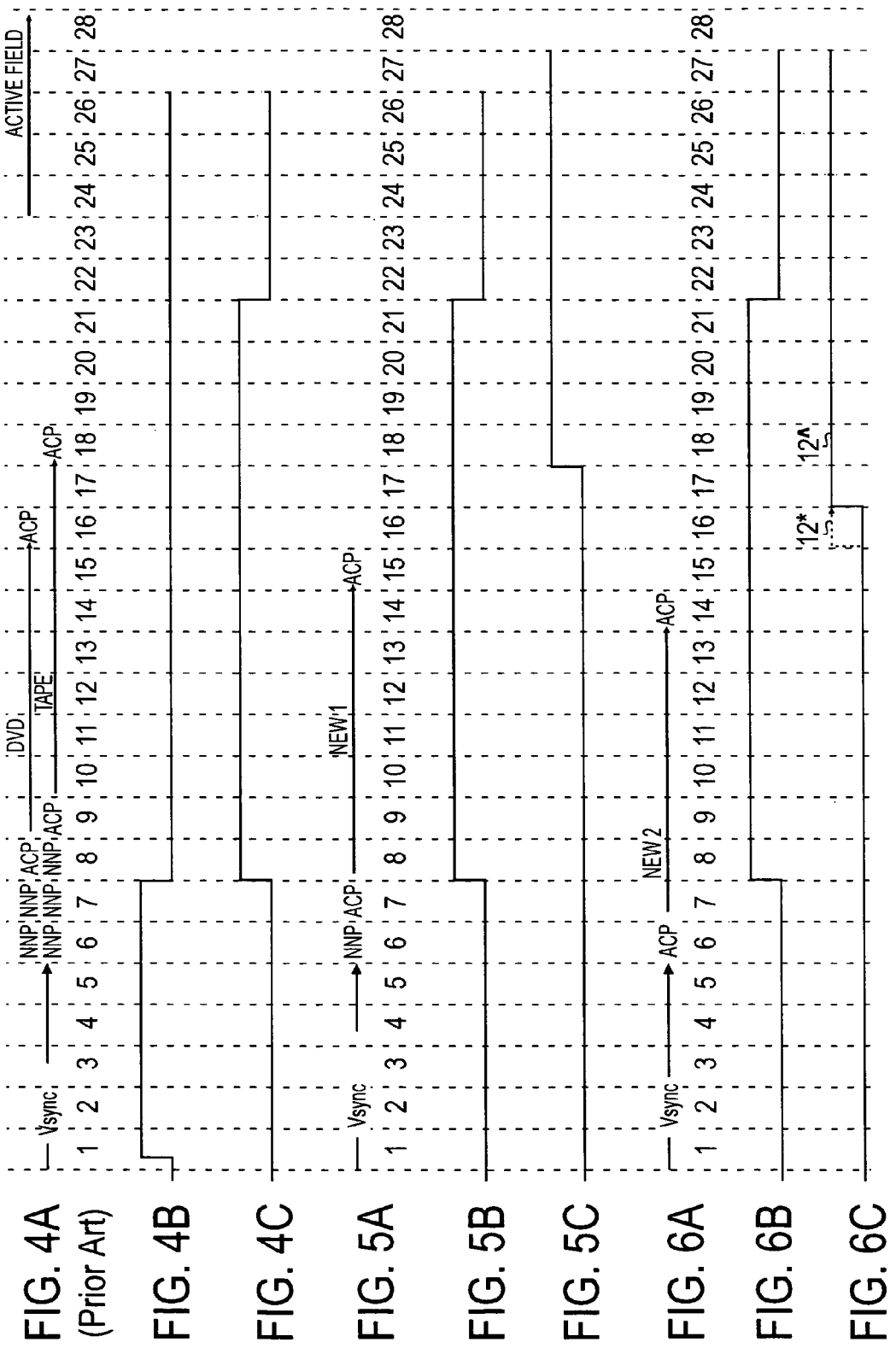

METHOD AND APPARATUS FOR SYNTHESIZING COPY PROTECTION FOR REDUCING/DEFEATING THE EFFECTIVENESS OR CAPABILITY OF A CIRCUMVENTION DEVICE

BACKGROUND OF THE INVENTION

The present invention relates to television anti-copy protection processes which hamper or inhibit recording as, for example, on a video cassette recorder (VCR) or personal video recorder (PVR). In the field of anti-copy protection signals, negative going pulses are paired with positive going pulses. For example, pseudo sync and automatic gain control (AGC) pulses and or sync pulses and AGC pulses constitute signals that cause a reaction in AGC systems in a VCR, or are detected by a reading system in a compliant device such as a PVR, digital recorder, analog to digital convertor. In general, a video anti-copy protection process (e.g., copy protected video signal or a video signal including one or more copy protection signal such as pseudo sync/AGC pulses) is playable on a television (TV) display while generally causing darkening, color distortion, tearing, loss in at least a portion of a program video signal, or video gain effects in a recorded copy.

However, such signals have been circumvented by circumvention devices, commonly referred to as "black box" devices, which remove or attenuate the effects of the anti-copy protection pulses, while passing through the (active field) program video intact. Such "black boxes" generally replace the negative (e.g., pseudo sync) and or positive going pulses (e.g. AGC pulses/signals) with a blanking level or newly regenerated sync pulses free of pseudo sync/AGC signals.

A copy protection process disclosed in U.S. Pat. No. 4,631,603, John O. Ryan, December 1986, assigned to Macrovision Corporation, Santa Clara, Calif., incorporated by reference, is well known to have placed pseudo sync and AGC pulses in specific television (TV) lines for pre-recorded video home systems (VHS) tape and digital video disc (DVD) playback devices. These pseudo sync/AGC pulses inserted in a program video signal prohibit recording by affecting the AGC system of a recorder, while allowing (substantially) normal display of the program video signal. However, the makers of the circumvention devices have observed the locations of the added pulses in the vertical blanking interval (VB1), and accordingly have generated a timing pulse to blank out or to modify at least some of the copy protection signals.

Several of the newer circumvention devices do away with conventional timing circuits and rely on microprocessors to provide the blanking pulses. Other circumvention devices utilize traditional timing circuits (e.g., retriggerable one shot) to locate the copy protection pulses.

Also, in the field of copy protection, the anti-copy protection signals are usually hidden in a portion of the vertical blanking interval, which generally cause a small scanning error in the display device. But because most displays overscan the video information, which results in a cropped picture, the scanning error is generally not noticeable. However, with some displays with less overscan, a small but perceivable geometric distortion may be observed when certain anti-copy protection signals are applied in the vertical blanking interval.

SUMMARY OF THE INVENTION

In some circumvention devices it was found experimentally that the black boxes can be disabled by observing the behavior of the microprocessors or certain traditional timing circuits in the black boxes, while still providing an effective anti-copy protection signal at the output of the device. And to reiterate, an anti-copy protection signal or video copy protected signal is playable on a TV display, while prohibiting recording (e.g., prohibiting recording via causing an erroneous signal level by affecting an AGC system in a recorder, which causes darkening, changes in contrast and or brightness levels). And unlike a scrambled video signal, which is not playable on a TV display, a copy protected video signal is displayed normally (e.g., with few or negligible or zero artifacts). In general, a video copy protection signal (or anti-copy protection signal) is provided, added, and or inserted to a video signal to produce/provide a copy protected video signal.

Accordingly, it would be desirable to provide, generate, or synthesize a video copy protection signal which in effect thwarts one or more intended functions of a circumvention device. One effect is to cause a circumvention device to allow the passage therethrough of a number of copy protection pulses or signals such that a VCR still reacts to the copy protection signals following the circumvention device. Another effect is to design a copy protection signal such that when it is supplied to a circumvention device, the output of the circumvention device still provides a detectable signal to a compliant video recorder or compliant device.

Yet another effect of an embodiment of the invention is to synthesize a copy protection signal such that when coupled to a circumvention device, the output of the circumvention device causes playability problems in a display (or increased copy protection effect(s)) such as blanking out a portion of the viewable area and or causing chroma artifacts.

The above mentioned effects can be implemented in a number of ways such as by moving, adding, or shifting anti-copy protection signals toward the vertical sync signal (e.g., in 525 and or 625 line TV standards). Alternatively, the effects can be implemented by synthesizing an anti-copy protection signal such that there is no more than one video line free of negative going pulse(s) between one horizontal blanking interval to a next horizontal blanking interval (e.g., one or more pseudo sync pulse is provided between lines).

Yet another novel feature of the invention improves playability in terms of reducing hooking that can be viewable in some monitors on the top portion of their displays. In particular, an embodiment provides a copy protection process comprised of Format A and Format B, wherein the formats are interleaved from one TV line to another. Because the formats have in general different positions of pseudo sync pulses or different numbers or pseudo sync pulses for each format, a TV scanning system's phase lock loop system can be excited into causing errors in scanning. By shifting the pseudo sync pulses of the Format A and Format B copy protection signals closer to the vertical sync signal area or away from the active field, the phase lock loop system is allowed to settle in such a way that playability is improved or that a scanning error is reduced. Alternatively, the playability is improved when Format A equals Format B, when the copy protection signals are shifted away from the active field, or when the copy protection signals are moved closer to the vertical sync signal in the vertical blanking interval (VBI).

Thus, one embodiment of the invention provides an improved playability copy protection signal, wherein the copy protection signal includes pseudo sync signals and provides in TV lines the pseudo sync signals located away from the active video field or closer to the vertical sync signal, wherein the (newly located or provided) pseudo sync signals provide less scanning errors or geometric distortion on a TV set. As described above, the pseudo sync signals may have (same or) different number of pseudo sync pulses from one TV line to another or (same or) different pseudo sync pulse width from one TV line to another line.

Another embodiment of the invention includes providing an improved playability of a copy protection signal, wherein the copy protection signal includes pseudo sync pulses (or pulse pair signals of pseudo sync and AGC signals) of a different number of pseudo sync pulses (or pseudo sync and AGC signals) from one TV line to another line and or different pseudo sync (or pseudo sync and AGC) pulse widths from one TV line to another. This embodiment includes modifying or providing at least one TV line to provide at least two lines consecutively with substantially the same number of pseudo sync pulses and or substantially the same pseudo sync pulse width. It should be noted that the resulting copy protection signal may still include an alternating pattern or format of a number of pseudo sync pulses and or pseudo sync pulse widths from one line to another.

By way of example, an embodiment of the invention may have (in a 625 line standard such as, for example, PAL or Secam) a Format A, which has 7 (or 6 or at least 1) pseudo sync or AGC pulses on video line 7 (or 6), followed by Format B, which has 6 (or 7 or at least 1) pseudo sync or AGC pulses on video line 8 (or 7). This example embodiment provides resistance to the intended function of a circumvention device by, for example, causing the black box to blank color burst in a portion of the active field, causing the circumvention device (black box) to remove or modify program video in an active portion of the TV field, and or causing the circumvention device to allow the passage of at least some or all of copy protection signals in a TV field. This embodiment also may provide improved playability of the program video signal.

Similarly, in a 525 line standard (e.g., NTSC or PAL-M), another embodiment of the invention provides one or more (e.g., 4) pseudo sync pulses or pseudo sync and AGC pulses (e.g., starting) at line(s) 10, 11, 272, and or 273. In this embodiment of a 525 line standard, resistance to a circumvention device is provided. For example, the circumvention device passes some or all of the copy protection signals to provide a copy protection or content control effect, whereas the circumvention devices intended function is to remove the copy protection signal to defeat a copy protection or content control effect.

The 525 or 625 line standard embodiments of previous example provide improved playability for the copy protection process (or for a content control signal), for example, in terms of reduced geometric distortion on a display.

BRIEF DESCRIPTION OF THE DRAWINGS

FIGS. 2A and 2B are waveforms illustrating examples of one or more embodiments of the invention.

FIG. 4A illustrates the line locations of two prior art copy protection processes within a portion of the vertical blanking interval (VBI) and active field.

FIG. 4B is a waveform illustrating an output of a first timing circuit of a prior art sync separator and timing circuit.

FIG. 4C is a waveform illustrating a blanking or removing pulse triggered by the trailing edge of the waveform in FIG. 4B.

FIG. 5A illustrates the line locations of copy protection signals for an embodiment (e.g., NEW1) of the invention.

FIG. 5B is a waveform illustrating a blanking or removing pulse derived from timing circuits 22 or 22" of FIG. 3A or 3C, respectively.

FIG. 5C is a waveform illustrating a blanking or removing pulse derived from circuit 22' of FIG. 3B.

FIG. 6A illustrates the line locations of alternative copy protection signals for another embodiment (e.g., NEW2) of the invention.

FIG. 6B is a waveform illustrating a blanking or removing pulse derived from circuit 12 of FIG. 3A.

FIG. 6C is a waveform illustrating a blanking or removing pulse 12^ or 12* derived from circuits 22' or 22" of FIG. 3B or 3C, respectively.

DETAILED DESCRIPTION OF THE INVENTION

Figure 1A:
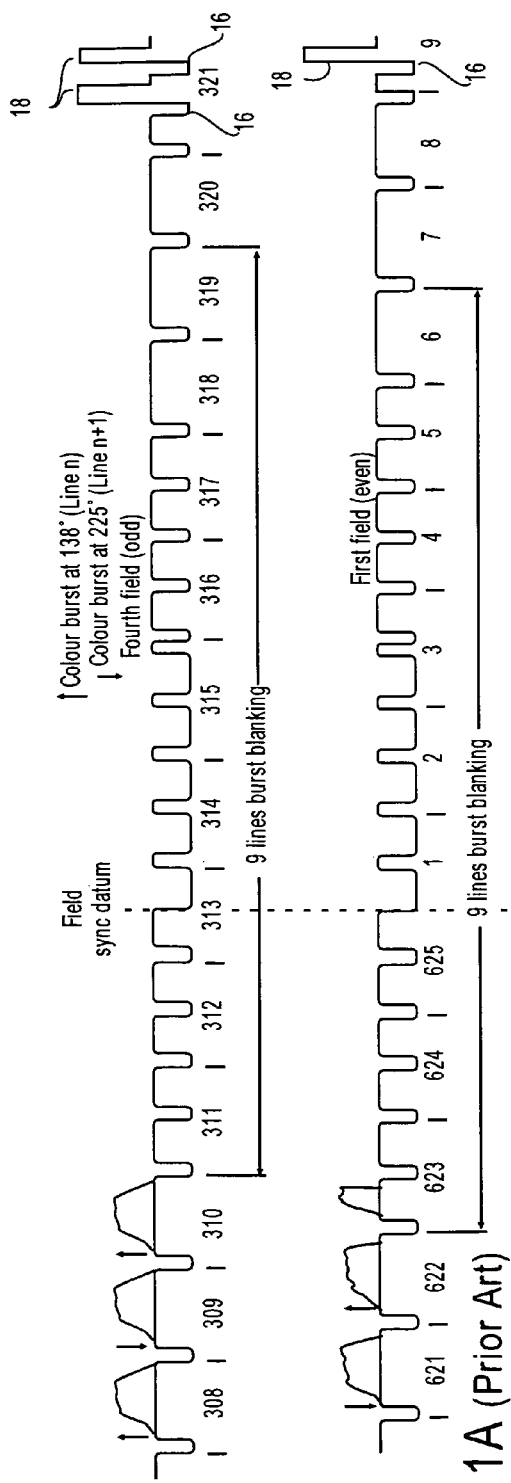
FIGS. 1A and 1B are waveforms illustrating examples of prior art copy protection signals.

FIG. 1A illustrates a prior art example of a signal in a video home systems (VHS) tape process for providing copy protection employing one or more pseudo sync/AGC (automatic gain control) pulse pairs starting in lines 9 and or 321 for a 625 line standard. Circumvention devices remove one or more of the pseudo sync/AGC pulses to allow a recordable copy. Pseudo syncs pulses are illustrated by numeral 16 and AGC pulses are illustrated by numeral 18 in FIGS. 1A, 1B, 2A, and 2B.

Figure 1B:
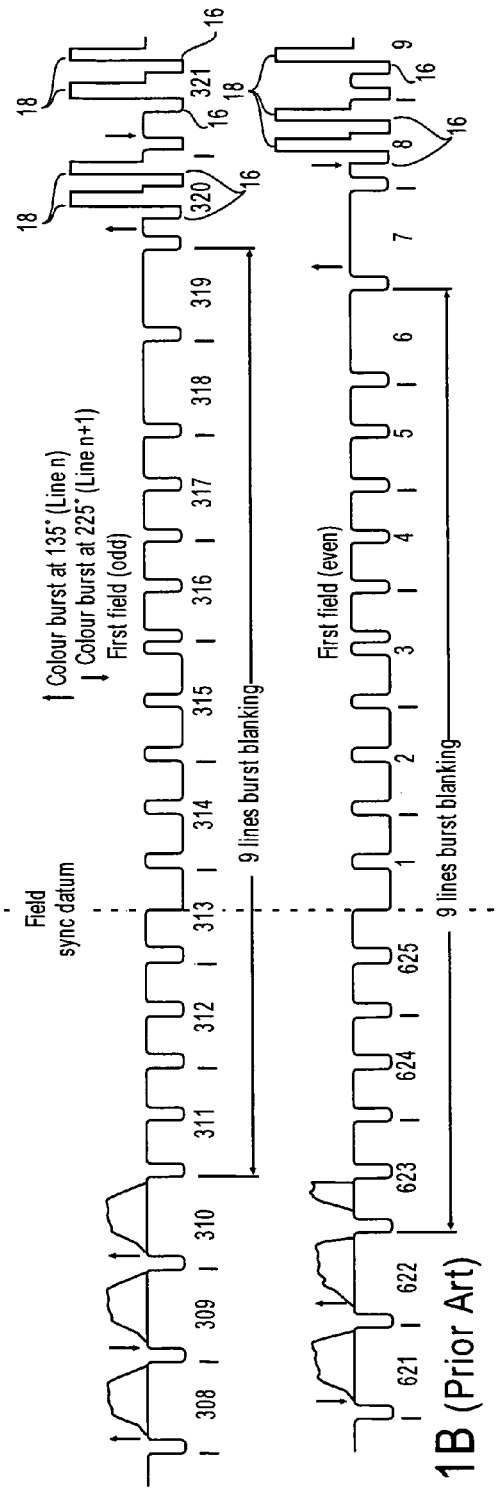

FIG. 1B illustrates a prior art example of a DVD (or tape) process for providing copy protection employing one or more pseudo sync/AGC pulse pairs starting in lines 8 and or 320 for a 625 line standard. Circumvention devices remove one or more of the pseudo sync/AGC pulses to allow a recordable copy.

Figure 1C:
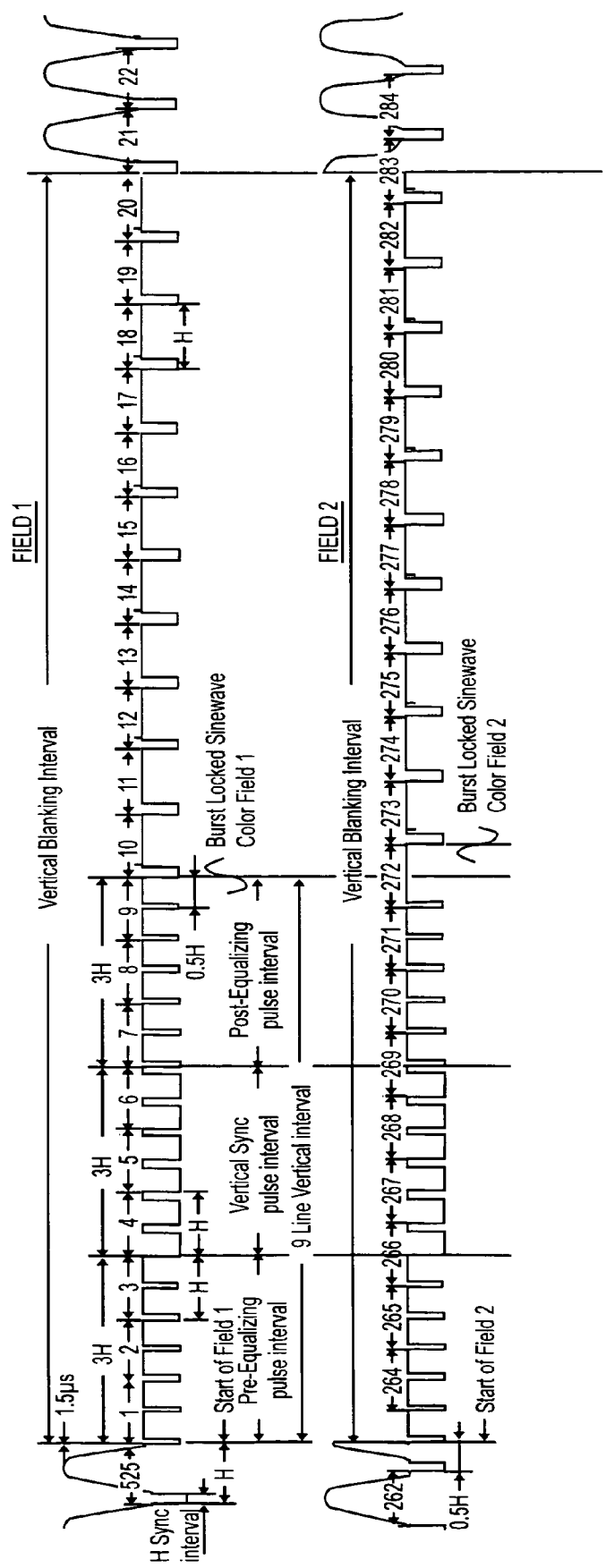
FIG. 1C are waveforms of video line locations for a 525 line TV standard such as NTSC.

FIG. 1C illustrates a prior art example of the standard TV line allocation for a 525 TV line standard, NTSC.

FIG. 2A or 2B illustrates an embodiment of the invention wherein one or more pseudo sync pulse (or pseudo sync/AGC pulses) is inserted in lines 7 (or 6) and or 319 (or 318) for a 625 line standard example. This particular example of line assignment for pseudo sync (or pseudo sync/AGC) pulses causes some circumvention devices to experience one or more of the following (failures in intended function):

1) Fail in removing one or more copy protection pulses, or still allow an effective copy protection signal or content control signal to be passed to a recorder or compliant device.

2) Fail in providing an improved playable video signal by degrading the video signal via blanking/attenuating/removing a portion of the active field (program) video picture.

3) Fail in providing an improved playable video signal by degrading the video signal via blanking/attenuating/removing at least a portion of color burst in TV lines near or in a portion of the active field (which for example, causes color to unlock at the top of the picture causing color distortion when recorded or played back, or when sent directly to a TV set.).

Figure 3A:
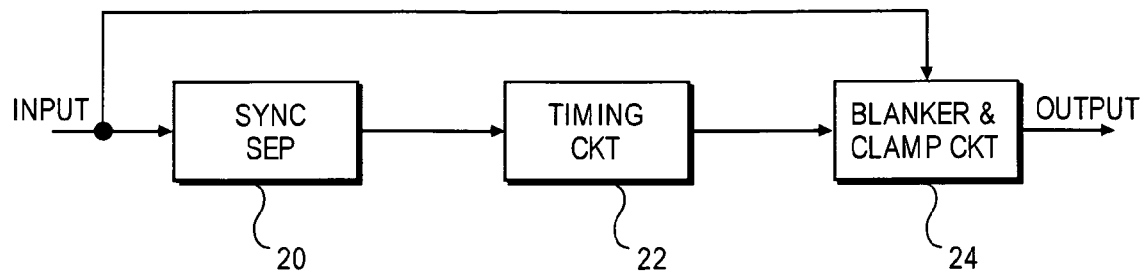
FIG. 3A is a block diagram illustrating a prior art circumvention ("black box") device.

FIG. 3A illustrates a prior art circumvention device, which removes copy protection pulses typically located inside a portion of the vertical blanking interval (VBI). Copy protected video containing typically pseudo sync/AGC pulses as illustrated in FIG. 1A or 1B is coupled to the input of a sync separator circuit 20. The output of sync separator circuit 20 is coupled to a timing circuit, 22, which provides typically a logic signal coincident with line locations of the input's copy protection signal to a blanker circuit 24. Blanker circuit 24 then removes or replaces the copy protection signals with another signal such as a blanking level, which therefore removes pseudo sync/AGC pulses while passing substantially the video program from the input. This provides a new signal at the output of the blanker circuit 24, whereby the output of circuit 24 provides a recordable signal.

Figure 3B:
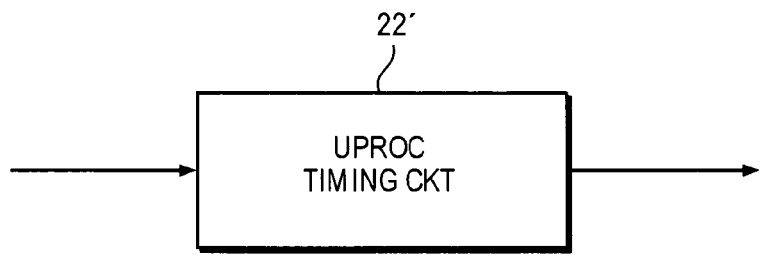
FIG. 3B is a block diagram illustrating a timing circuit including a microprocessor device for a circumvention device.

FIG. 3B shows an example of an alternative timing circuit 22', which uses a microprocessor or computational circuit. Circuit 22' may provide a signal to the blanker circuit 24 of FIG. 3A via an alternative method. For example, circuit 22', as found experimentally, may require at least two lines of video that do not have a second (e.g., extra) negative going pulse during an interval of one horizontal line's duration (e.g., 63.55 usec or 64 usec) after the vertical sync signal. An example of this is illustrated in FIG. 1A where the last vertical sync signal ends on line 5, and (three) lines 6, 7, and 8 are free of negative going pulses within a horizontal line duration (before extra negative pulses such as pseudo sync pulses (16) appear on line 9 and other lines beyond). In a standard TV signal for 625 or 525 lines, the vertical sync signal always includes (extra or second) sync pulses that occur at twice the horizontal frequency. This means that one extra pulse is inserted between a TV line interval for the vertical sync signal, which typically includes equalization sync pulses and (serrated) broad pulses or vertical sync pulses. Circuit 22' senses the one or more extra negative going pulses between a TV line interval (e.g., about 64 microseconds or 63.55 microseconds) to determine the presence of the vertical blanking interval (VBI). After two or more lines which do not include the extra inserted negative going pulse are determined, a blanking pulse is generated.

Similarly in FIG. 1B (two) lines 6 and 7 are free of (extra) negative going pulse(s) within one horizontal line's duration.

Timing circuit 22' (FIG. 3B) searches for at least a two line gap free of (extra) negative going pulse(s) within a horizontal line duration, and provides a blanking pulse for the removal of the copy protection pulses starting from lines 9 or 8, as illustrated in FIGS. 1A and 1B respectively. Thus, microprocessor timing circuit 22' has no problem in providing a signal for removal of the copy protection signals, as illustrated in FIG. 1A or 1B. However, for the waveforms in FIG. 2A or 2B, the pseudo syncs occur in lines in which the microprocessor timing circuit 22' reads as still part of the vertical sync signal, and thus does not output a signal (e.g., for removal or defeating copy protection signals) until after the last line of copy protection signal (e.g., the last line in the VBI that still has pseudo sync pulses such as line 16, 17 or 18 or beyond). Circuit 22' reads the pseudo sync pulses as equalizing pulses or some part of the vertical sync signal, and thus is programmed not to remove any pulses or signals resembling a vertical sync signal. (Removing a vertical sync signal is prohibited by the microprocessor since this would cause a loss in vertical sync or cause a TV display to unlock field/frame-wise.). Thus, careful line location (or placement) of the pseudo sync pulses for a copy protected video signal causes microprocessor timing circuit 22' to allow passage of at least some or all of the pseudo sync or pseudo sync and AGC pulses to the circumvention device's output (terminal).

Figure 3C:
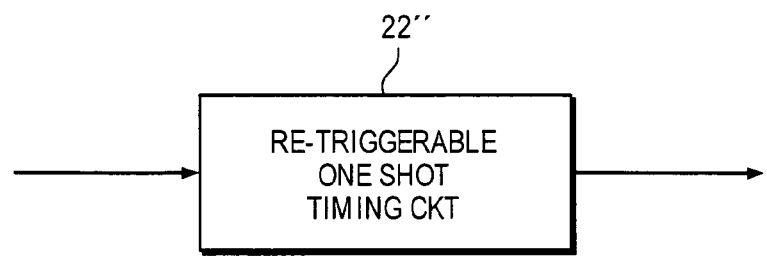
FIG. 3C is a block diagram illustrating a timing circuit including a retriggerable circuit for a circumvention device.

FIG. 3C illustrates another timing circuit, 22", which includes a retriggerable one shot or equivalent. Essentially, circuit 22" is turned to a high logic level without interruption during the presence of a vertical sync signal in the VBI. For example, if timing circuit 22" is set to produce a 45 microsecond pulse, then when a vertical sync signal triggers the circuit 22", a logic signal at the output of circuit 22" is turned high during the vertical sync signal. The output of timing circuit 22" is then high continuously because of the pulses between a TV line's interval, which retriggers and causes a high output due to 2H pulses that are spaced about 31.5 usecs or 32 usecs apart (e.g., pre/post equalizing pulses or serrated (broad) vertical sync pulses) in the vertical sync signal. When one or more pseudo sync pulses is added or provided to TV lines after the post equalizing (2H) pulses of a vertical sync signal, the one or more pseudo sync pulse also has the same effect on a retriggerable timing circuit as the 2H pulses. Thus, placement of pseudo sync pulses right after the vertical sync signal or the post equalizing pulse causes the retriggerable circuit to remain high, continuously from the vertical sync signal, until after the last TV line which includes pseudo sync pulses. A circumvention device (black box) that includes this type of retriggerable timing circuit thus will allow passage of some or all of the (inventive or newly placed) pseudo sync or copy protection signals to the output of the black box.

FIG. 4A illustrates a line location of prior art copy protection signals such as anti-copy protection (ACP) in a 625 line standard format. For example, in video lines 8-16, the prior art ACP signal (e.g., for set top boxes or DVD players) is comprised of pseudo sync and AGC pulses. Similarly, for video tape copy protection, the prior art copy protection process is comprised of ACP signals (e.g., pseudo sync and or AGC pulses) from lines 9-18.

Also shown in FIG. 4A is the video line location from a vertical sync signal (e.g., such as including broad vertical sync pulses, and or post equalizing pulses) as lines 1-5 in a 625 (e.g., PAL or SECAM) TV standard.

FIG. 4A shows the beginning of the active field of the video signal as line 24 and beyond, and video lines 6 and 7 (or line 8 in a tape process) show that they have no extra negative pulse(s) (NNP).

FIG. 4B illustrates that the vertical sync signal is sensed by circumvention devices, and a timing signal is generated to create a high to low logic signal transition at approximately line 8 of the VBI.

FIG. 4C then shows a pulse which is triggered by the pulse high to low transition of FIG. 4B, wherein the pulse in FIG. 4C is logic high from line 8 to about line 21 (or to at least line 18), which blanks or modifies the ACP signals as seen in FIG. 4A. With the prior art ACP signals of FIG. 4A, any of the timing circuits 22, 22' and 22" is effective in removing the ACP signals depicted in FIG. 4A.

FIG. 5A illustrates an embodiment of the invention for providing or synthesizing a new copy protection signal (e.g., NEW1). Here the copy protection signal, which includes negative going pulse(s) (e.g., one or more pseudo sync pulse) and or positive going pulse(s) (e.g., one or more AGC pulse (s)) that is/are inserted in line 7. Note that in this example, there is one video line (e.g., line 6) free of one or more extra negative going pulse after the vertical sync signal. One embodiment of the invention includes a one line gap (e.g., line 6) between a vertical sync signal and a copy protection signal including negative going pulse(s).

FIG. 5B illustrates that copy protection pulses are mostly removed by a timing circuit 12 or 12", which allows the recording of an illegal copy. To the contrary, FIG. 5C shows that the copy protection signals are not removed by timing circuit 22' (e.g., microprocessor timing circuit). Instead, at least a line (e.g., lines 24 to 27) of the active field is/are removed or blanked out. The reason for the erroneous operation of the circumvention device is because the microprocessor circuit 22' is expecting at least two lines free of (negative going, equalizing, and or pseudo sync) pulses between two horizontal intervals. In FIG. 5A, the new copy protection signal has only one line free of negative pulses between two horizontal (e.g., blanking) intervals. Recall that the post equalizing sync pulses and pseudo sync pulse(s) are (extra) negative going pulses between two horizontal blanking (or line) intervals.

FIG. 6A illustrates another embodiment (e.g., NEW2) of the invention where the negative going pulses are added to a line adjacent to the vertical sync signal (e.g., line location of post equalizing pulse(s)). For example, in the PAL standard or 625 TV line standard, the end of the vertical sync signal may be the last post equalizing sync pulse on lines 5 and/or 317. So an embodiment of the invention may include adding pulses (e.g., negative going pulses, pseudo sync pulses or pulse pair signals) on lines 6, 7, 318, and or 319. Similarly, in a 525 TV line standard (FIG. 1C), pulses may be added, as described above, on lines 10, 11, 272, and or 273.

In another example, such as in a PAL standard, as long as there is no more than one video line after the vertical sync signal that is free of (extra) negative going (e.g., pseudo sync, or an extra sync) pulse(s), certain circumvention devices will be defeated by the new copy protection signal. Thus, an embodiment includes a number of lines containing negative going pulse(s) immediately after, or one line delayed from, a post equalizing vertical sync pulse (or a vertical sync signal). This number of lines may be consecutive in terms of containing negative going pulses, such as pseudo sync pulses, or may have one line in a set or series of TV lines that does not have the (e.g., extra) negative going pulses.

In one embodiment of the invention, typically 6-14 lines in the VBI (and or its vicinity) including 2-8 pseudo sync pulses or pulse pair signals (per line) will begin at lines 6, 7, 318, and or 319, for a 625 (PAL or SECAM) line standard. Similarly, in a 525 NTSC or equivalent line locations for NTSC or PAL-M line standard the pulses begin at lines 10, 11, 272, and or 273.

FIG. 6C illustrates that there is no video line that is free of an extra negative going pulse(s) (e.g., no gap) because post equalizing pulses (e.g., line 5 part of a vertical sync signal) are followed in the next line with other negative going pulse(s) such as for example, pseudo sync pulse(s) on line 6 (in FIG. 6A). Thus, both timing circuits 22' and 22" fail to provide the correct blanking or removal pulse. Instead, the copy protection pulses of FIG. 6A are not removed or reduced, while blanking or removing occurs in a portion of the active video field. Modification or blanking of a portion of the video signal is denoted by the logic high states of signals 12* and or 12^. In FIG. 6C, signal 12* shows how a circumvention device would remove or modify a portion of the signal from line 16 to a portion of the active field, while passing at least an effective number of copy protection signals residing prior to line 16. Similarly, signal 12A shows again how a circumvention device would blank, attenuate, or modify a portion of the video signal from video line 17 to a top portion of the active video field, while allowing passage of copy protection signals prior to line 17.

It should be noted that the circuit 22 of FIG. 3A still effectively removes the new copy protection signal of FIG. 6A.

Figure 7:
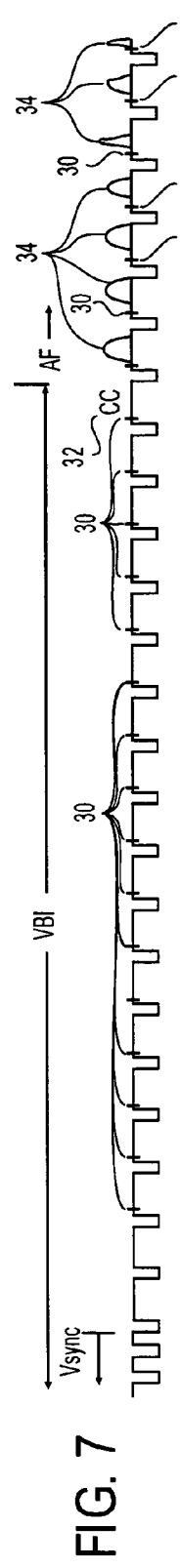
FIG. 7 is a waveform illustrating a video signal prior to inserting or adding a copy protection signal.

FIG. 7 illustrates a typical or standard video signal in a portion of the vertical blanking interval (VBI) and active television field. Color burst envelopes, which are used in recorder and or TV sets for proper color decoding or reproduction, are denoted by numeral 30. A Closed Caption (CC) data line or data signal is denoted by numeral 32. Active field (AF) program video (line) is illustrated by numeral 34.

Figure 8A:
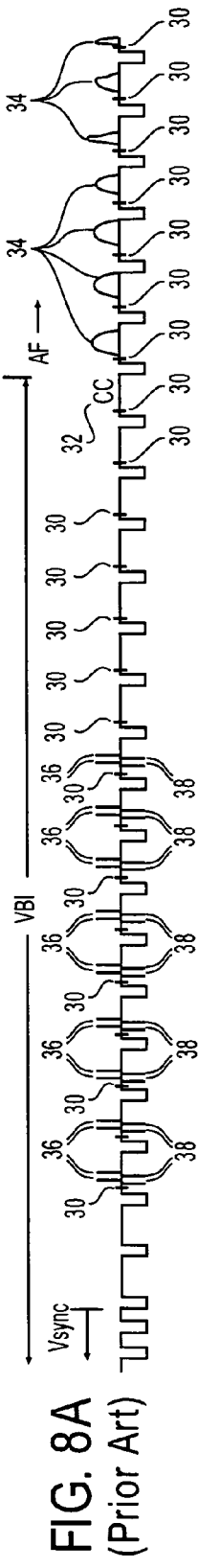
FIG. 8A is a waveform illustrating a video signal with a prior art copy protection signal.

FIG. 8A illustrates a prior art copy protection signal including AGC pulses 36 and pseudo sync pulse 38.

Figure 9A:
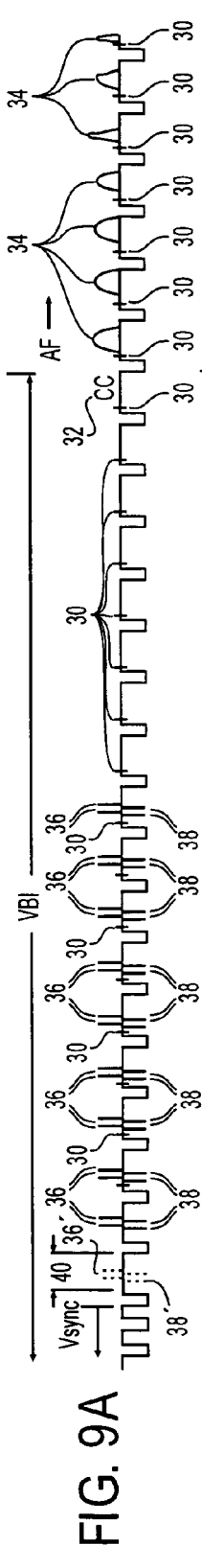
FIG. 9A is a waveform illustrating a video signal with a copy protection signal of an embodiment of the invention.
Figure 9B:
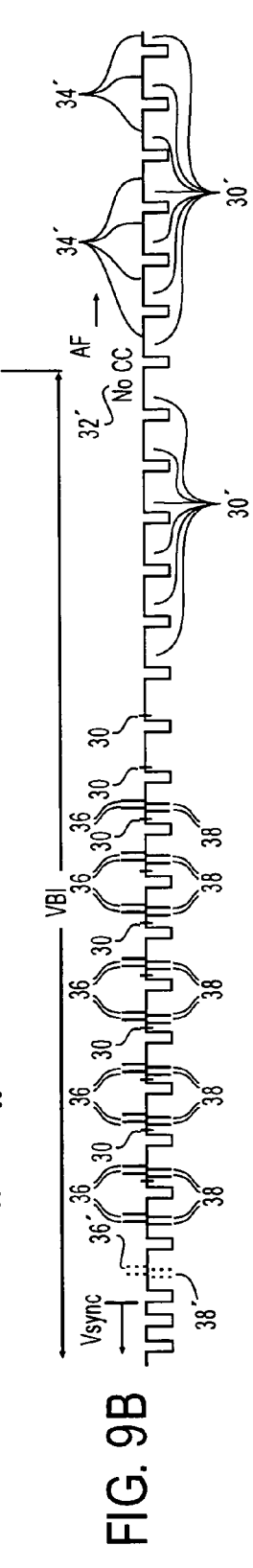
FIG. 9B is a waveform illustrating an effect of a prior art circumvention device on the video signal of FIG. 9A.

Just for illustration purposes, the number of pseudo sync and AGC pulses in FIGS. 8A, 9A and 9B, are shown to have 2 pulse pairs per TV lines, but any number greater than or equal to 1 pulse pair per line may be implemented in, for example, the FIGS. 8A, 9A, and or 9B.

Figure 8B:
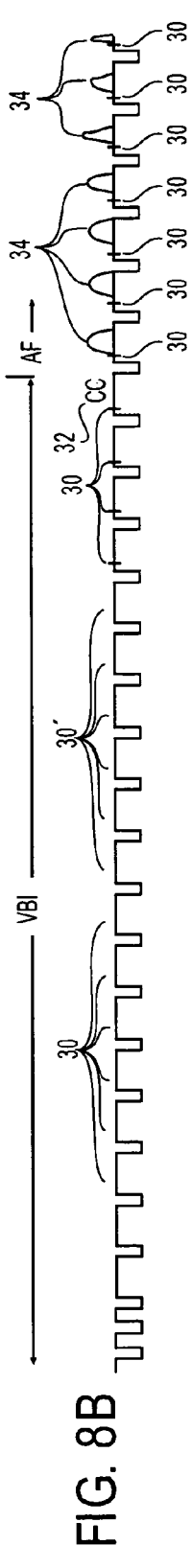
FIG. 8B is a waveform illustrating an effect of a prior art circumvention device on the video signal of FIG. 8A.

FIG. 8B illustrates the effect of a circumvention device utilizing, for example, the timing circuit 22' of FIG. 3B. The prior art copy protection signals 38 (pseudo sync) and 32 (AGC) shown in FIG. 8A, are removed, and so are a number of color bursts 30 of FIG. 8A removed in the VBI. The removal of color bursts is depicted in FIG. 8B by numeral 30'.

FIG. 9A illustrates an embodiment of the invention where the copy protection signals start sooner than the prior art copy protection signals; that is, start in the first or second line after the vertical sync signal. In FIG. 9A there is only a one line gap 40, which is free of copy protection (e.g., copy protection signal may include pseudo sync and or AGC) or "extra" negative going pulses (38, or 38 and 36) after the vertical sync signal.

FIG. 9B then illustrates the effect(s) of a circumvention device mishandling the new copy protection signal (e.g., pseudo sync and or AGC pulses) shown in FIG. 9A. Here a microprocessor timing circuit 22' (for example) causes the particular prior art circumvention device to pass one or more or all of the copy protections signals (e.g., pulses 38 and or 36) to the circumvention device's output, which action is opposite to the intended function thereof, thereby still providing the (black box's) output with an effective copy protection signal. Furthermore, the output of the prior art circumvention device includes the loss of the color bursts of FIG. 9A, into a top portion of the active field TV lines, which will cause noticeable and viewable color demodulation problems. The removal and thus lack of color bursts is depicted in FIG. 9B by numeral 30'.

Also, because a portion of the active video field is missing or blanked out, the effectiveness of the copy protection is enhanced. For example, signal 34' denotes a blanked or altered portion of the active field video program signal 34 of FIG. 9A. For example, one or more or all of the copy protection signals is/are passed to the output of the circumvention device. But, the circumvention device also provides a blanked portion of viewable video, and/or provides loss of color burst, as depicted by numeral 30'(blanked or modified color burst) in FIG. 9B, in sufficient TV lines to cause errors in color demodulation or decoding in a TV set or recorder. So by providing or synthesizing the new copy protection signal, certain black boxes actually increase the effectiveness of the enhanced and or new copy protection signal. Alternatively, the certain circumvention devices cause playability problems on TV monitors as, for example, by blanking or modifying one or more color burst signals (e.g., FIG. 9B, numeral 30').

Also shown in dotted lines in FIG. 9A or 9B, is an alternative new copy protection process where copy protection signals 36', 38' are added in the first video line interval after V sync, whereby there is no TV line free of copy protection or negative going pulses after a vertical sync signal. This alternative embodiment works similarly in that one or more or all copy protection signals are passed to the output of the circumvention device (e.g., circumvention devices that utilize for example, a microprocessor timing circuit 22' or a retriggerable timing circuit 22". The circumvention device further enhances the new copy protection process by blanking out a portion of an active field (as depicted by numeral 34'), and or causes improper locking of color reproduction on a TV monitor or recorder as, for example, by blanking or modifying one or more color burst signals (as depicted by numeral 30'). It should be noted for clarity in the illustrations for FIGS. 8A, 9A, and or 9B, one or more color burst envelope is not necessarily labeled as 30 on every line.

Figure 10:
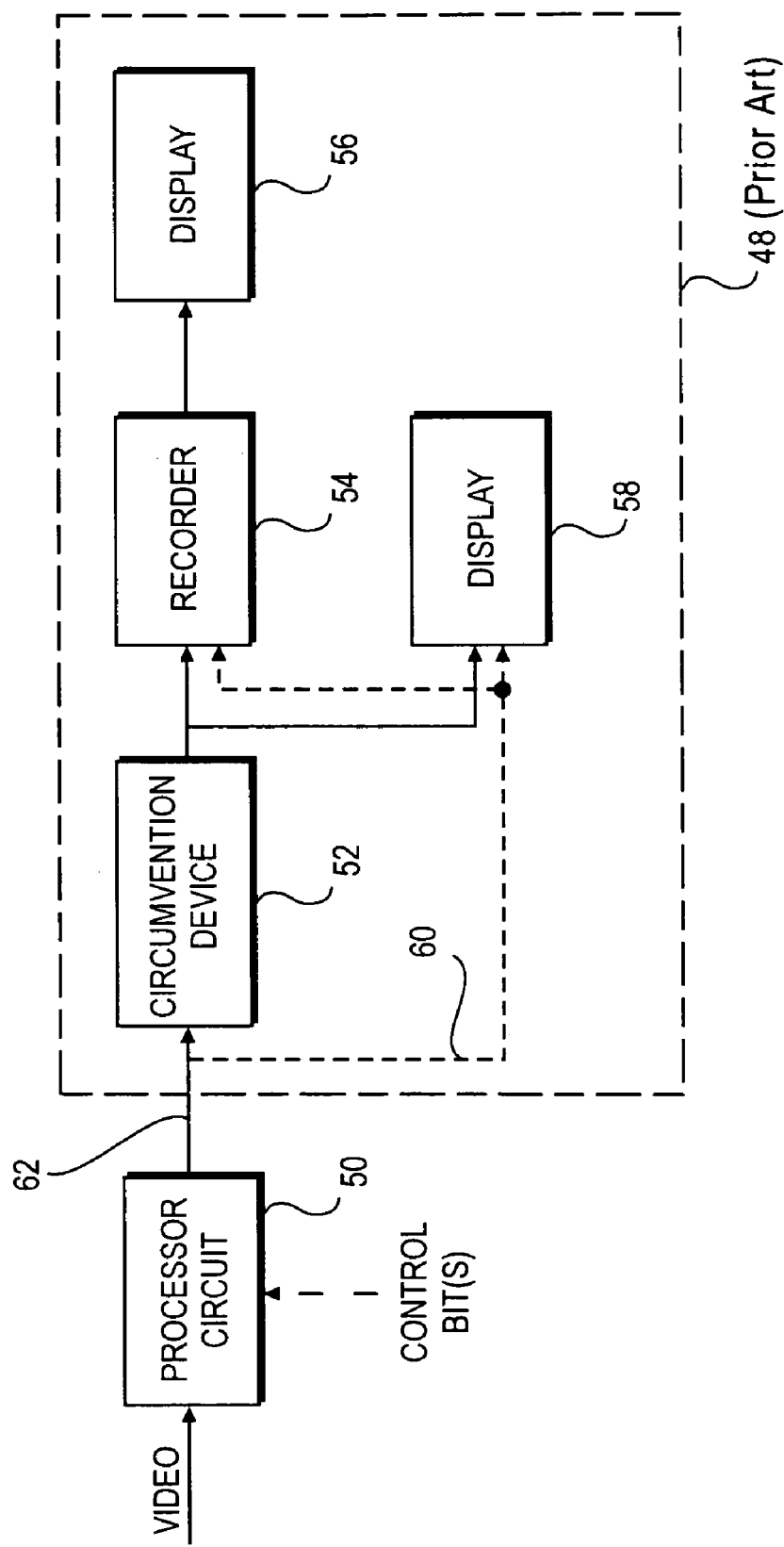
FIG. 10 is a block diagram illustrating an embodiment of the invention comprising a processor, which is coupled to a circumvention device and other equipment.

FIG. 10 illustrates an example of the embodiment or apparatus of the invention, comprising a processor circuit 50. Circuit 50 may be part of an integrated circuit, which receives video in analog and or digital form. Circuit 50 outputs an analog video signal that provides a copy protection effect and reduces the effectiveness of a circumvention device. To this end, the apparatus may include control bit(s) to configure (any of the) various versions of the inventive waveforms (e.g. FIGS. 2A, 2B, 5A, 6A, and or 9A) and or to enable or to disable any version of the copy protection signal at the analog output of processor circuit 50. For example, digital video may be coupled to an input of processor circuit 50, which may include one or more waveform circuits (e.g., fixed or programmable) to synthesize one or more negative going pulse, or one or more pulse pair signal including sync/pseudo sync and AGC pulse. The negative going pulse(s) are included immediately following, or in the next line after, a vertical sync signal, or a first/second line after a vertical sync signal that is typically outside a sync interval or location. Circuit 50 may include an encoder and or digital to analog converter to provide an analog signal of one or more TV standards. The analog signal may include a copy protection signal that is resistant to black boxes, a copy protection signal that causes a black box to further discourage copying and or to cause the black box in conjunction with the copy protection signal to provide a synergistic copy protection effect.

A synergistic effect may include passing one or more copy protection signals or pulses to the output of the circumvention device, which causes darkening or other copy protection effects on a recording, while causing the circumvention device to implement one or more of the following artifacts:

1) A clamp error in a portion of the program video signal, which causes level shifting, typically undesirable, in a part of the video signal.

2) A loss of color burst in one or more active TV lines.

3) A loss of program video information in one or more active TV line, which can include darkening or a blanking near or at the top of the display (or from a recorder).

4) Color unlocking or color distortion (e.g., errors in hue and or saturation) in one or more active TV lines, which can lead to incorrect color displayed on one or more lines near or at the top of the display, or loss of color for one or more lines near the top of the display. Recorders may also exhibit extra color unlocking (or color distortion) upon record and or playback.

5) New or increased playability artifact(s) when coupled to a TV display, which can include both (or either) color and extra darkening (or blanking and or attenuating) effects on a TV display and or a recorder.

Processor circuit 50 may include control bits or one or more bit patterns to enable, configure, and or disable at least a portion of the copy protection signal.

Also illustrated in FIG. 10 is an exemplary prior art circumvention device ("black box") 52 (e.g., a circumvention device with a timing circuit 22' or 22"), a recorder 54 coupled to the prior art circumvention device 52, and a first display 56 that is coupled to the recorder. Also shown is a second display 58 coupled to an output of circumvention device 52.

Dashed line 60 depicts a "bypass" mode where the new copy protection signal is coupled directly to recorder 54 and display 58. In this bypass mode, the new copy protection signal has little or no artifacts displayed on display 58. In the bypass mode, recorder 54 and a playback monitor show a darkened playback of an illegal copy, or other copy protection effects such as, for example, AGC gain variation or effect, brightness change, and or turning off (for a compliant device) the recording/viewing process.

However, if the mode is not used, the circumvention device's input 62 is coupled to a video source (via processor circuit 50) with the new copy protection signal(s) of the invention.

The output of circumvention device 52 then outputs a video signal with a copy protection signal, which in turn causes recorder 54 to exhibit copy protection-effect(s) such as darkening, AGC effect, brightness change, and or shutting down (e.g., compliant device will shut down recording or viewing), and one or more of the following problems:

A clamp error in a portion of the program video signal.

A loss of color burst in one or more active TV lines.

A loss of program video information in one or more active TV lines.

A color unlocking or color distortion in one or more active TV lines.

A new or increased playability artifact(s) when coupled to a TV display.

It follows that inserting a circumvention device actually causes more video problems than without it when the new copy protection signal of the present invention is applied. That is, the new copy protection signal causes more problems for a video pirate than without the circumvention device. For example, as previously explained, the new copy protection signal causes the circumvention device to enhance the copy protection effect, thereby discouraging the making of illegal copies of video programs.

It should be noted that one or more of the new copy protection processes provide resistance to circumvention device (s) (black boxes) or provide enhancement of or synergy to the copy protection process (or effectiveness).

It should be reiterated that the new copy protection signal embodiments also reduce playability problems in some monitors. For example, by shifting the copy protection signals toward the vertical sync signal, an overshoot or ringing error in the TV set's phase lock loop feedback system settles down better by the time an active field is displayed.

This better settling time in the horizontal scanning circuits of a TV set is especially applicable to copy protection signals where there is a position and or pulse-width modulation in the pseudo sync or AGC pulses from one TV line to another, or where the number of pseudo sync or AGC pulses changes from one TV line to another.

Correspondingly, a better settling time in a horizontal display or scanning system provides improved playability of the copy protection signal.

Thus, a prior art waveform (e.g., for PAL or NTSC) that is shifted or moved (e.g., advanced) toward the vertical sync signal, provides better playability. For example, copy protection signals, such as pseudo sync and or AGC pulses that are provided further away from the active field provide less noticeable hooking or tearing at the top of a display screen or in a portion of the overscan area.

For example, one 625 line standard, prior art copy protection signal, has a Format A that has seven pulse pairs (pseudo sync/AGC) on line 8 (and or lines 10, 12, 14, 16), which is then followed by Format B that has six pulse pairs on line 9 (and or lines 11, 13, 15). An example of Format A is 1.63 microseconds (±100 ns) wide for pseudo sync and 7 pseudo sync pulses per line, and or Format B having 1.78 microseconds (±100 ns) for pseudo sync and 6 pseudo sync pulses per line, or vice versa. Other numbers or values can be provided. This prior art signal then does not have resistance to certain black boxes and or can be improved in playability.

Thus to provide resistance to or defeat of a circumvention or black box device and or to provide improved playability, one or more embodiments of the invention include(s) shifting either (or both) formats A and/or B one or two lines toward the vertical sync signal such as:

1) Format A starting on line 6 (or 318) and/or line 7 (or 319)
2) Format B starting on line 6 (or 318) and/or line 7 (or 319)
Other alternative embodiments include:

Adding/inserting/synthesizing a Format A or Format B copy protection signal (e.g., starting) on lines 6, 7 and/or 8 and/or lines 318 and/or 319. In one example for a 625 line system, (including) lines 6, 8, 10, 12, and or 14 (and/or 16) may be of Format A (or B), while (including) lines 7, 9, 11, 13, and or 15 may be of Format B (or A). Format A represents a set of pseudo sync and or AGC pulses and Format B represents another set of pseudo sync and or AGC pulses.

Note that in general, any type of Format A and/or Format B signals may be provided in one or more selected TV lines, provided with a selected number of pulses (e.g., pseudo sync and or AGC) per line, or provided with selected pulse-width, pulse amplitude, and/or pulse position, for any of the added pulses (or sync pulse(s)). In certain cases Format A equals Format B, for example, for two or more consecutive lines. A copy protection process including two or more consecutive lines of (substantially) the same format toward the active field is one embodiment to improve playability or to still cause a problem with circumvention devices. For example, a process can start right after or delayed less than 2.5 lines after the vertical sync signal, with two formats interweaving/interlacing from one line to another. However, the last two or more lines that include pseudo syncs or copy protection signals may be a single format. Also, there is no limitation on how many formats can be provided (e.g., one or more formats).

One example embodiment of the invention (e.g., for improved playability) is to provide/include one or more (e.g., 4, 5, 6, or 7) pseudo sync or pseudo sync AGC pulses in three or more TV lines with at least one series of alternating formats in two (or more) lines (e.g., in consecutive lines), while providing two consecutive lines with substantially the same format. For example, a series of TV lines may include A'A'B', B'A'A', A'B'A'B'B', A'A'B'A'B', etc., where A' and B' each denote a particular format. In general, each format includes a particular number of pseudo sync and or AGC pulses per line, and or includes pseudo sync and or AGC pulse width and or position. U.S. Pat. No. 6,836,549 by Quan and Brill issued on Dec. 28, 2004, incorporated by reference, describes various methods and apparatuses for modulating in position, pulse width, and or amplitude of sync/pseudo sync and or AGC pulses, or changing the number of copy protection signals from one line to another, or gap-width modulation. Any embodiments of the invention may include one or more of the various methods apparatuses as described above for U.S. Pat. No. 6,836,549.

In any of the inventive processes/embodiments mentioned (e.g., copy protection signals that provide resistance to circumvention and or improved playability), one or more of the following may be provided/generated/inserted/added for a (further) method or apparatus of the invention (e.g., combination).

1) Modulating any of the copy protection pulses such as, for example, pseudo sync and or AGC pulses, by amplitude (e.g., may include a finite value and or zero amplitude), pulse-width, position, and or frequency (e.g., including changing a number of negative or positive going pulses from one video line to another line). Or providing at least one number (e.g., two or more (different) numbers) of pseudo sync and or AGC pulses per TV line interval in selected (e.g., two or more) TV lines.

2) Changing or shifting a portion of a video signal from one video line to another line such as, for example, lowering or raising a blanking or black level from one line to another line or from one set of lines to another set of lines. U.S. Pat. No. 5,583,936 by Wonfor et al. issued Dec. 10, 1996 and its divisional and continuation patents, incorporated by reference, describe modifying a basic copy protection signal (e.g., AGC pulses and or pseudo sync/AGC pulses) with level shifting a portion of the video signal, including a portion of the active video signal and or a portion of one or more blanking intervals, for example, a portion of front and or back porch region.

3) Adding or providing a color burst modification of at least a portion of one or more color burst envelopes. The modification may include phase, frequency, and or amplitude of one or more cycles of subcarrier, or may include adding cycles of subcarrier (e.g., widened (modified or unmodified) color burst envelope) or a reduced duration color burst envelope (modified or unmodified). One or more color burst modification is shown by U.S. Pat. No. 6,516,132 by Wrobleski and Quan issued Feb. 4, 2003 (incorporated by reference) and/or U.S. Pat. No. 7,039,294 by Quan issued May 2, 2006 (incorporated by reference). For example, such as segmentation of one or more color burst envelopes with two or more phases (e.g., normal and non-normal phase), and/or adding extra cycles of subcarrier in one or more horizontal blanking intervals, which can provide an extended (modified) color burst. Also sync position and or width may be altered.

4) Combining with content control or copy protection signal(s) (e.g., back porch pulses, AGC pulses, data, CGMS, flag signal, and or pseudo sync pulses) with other TV standards such as progressive (e.g., 240p, 480p, and or 576p), HDTV, and or low definition TV. Flag signals, data signals, and or copy protection signals for detection or use in a content control device/system is described in U.S. Pat. No. 5,315,448 by Ryan, issued May 24, 1994 (incorporated by reference).

5) Providing dynamic blanking or modification of a video signal (e.g., one or more active field video line or one or more color burst in an active field) via coupling to a circumvention device by changing or modifying/modulating negative going pulses in a portion of the vertical blanking interval. For example, if negative going pulses near the vertical sync signal are provided or removed (or changed in position, amplitude, or width) as a function of time, the circumvention device will blank a portion of active (field) video lines (and or pass through one or more copy protection signal) when the negative pulses are provided, and then not blank a portion of active (field) video lines (while reducing an effect of the copy protection signal(s)) when the negative pulses are not provided.

An illustration of providing dynamic copy protection signal or effect via a circumvention device would be to alternate/switch in time prior art signals of FIG. 1A or 1B and inventive signals of FIG. 2A or 2B. The output of the circumvention device will then generate a newly provided amplitude modulated (effect) of copy protection signals by modulating (in one to three lines) negative going pulses after a vertical sync signal.

FIGS. 11A through 11D illustrate example apparatuses or systems for implementing the various waveforms of the invention.

Figure 11A:
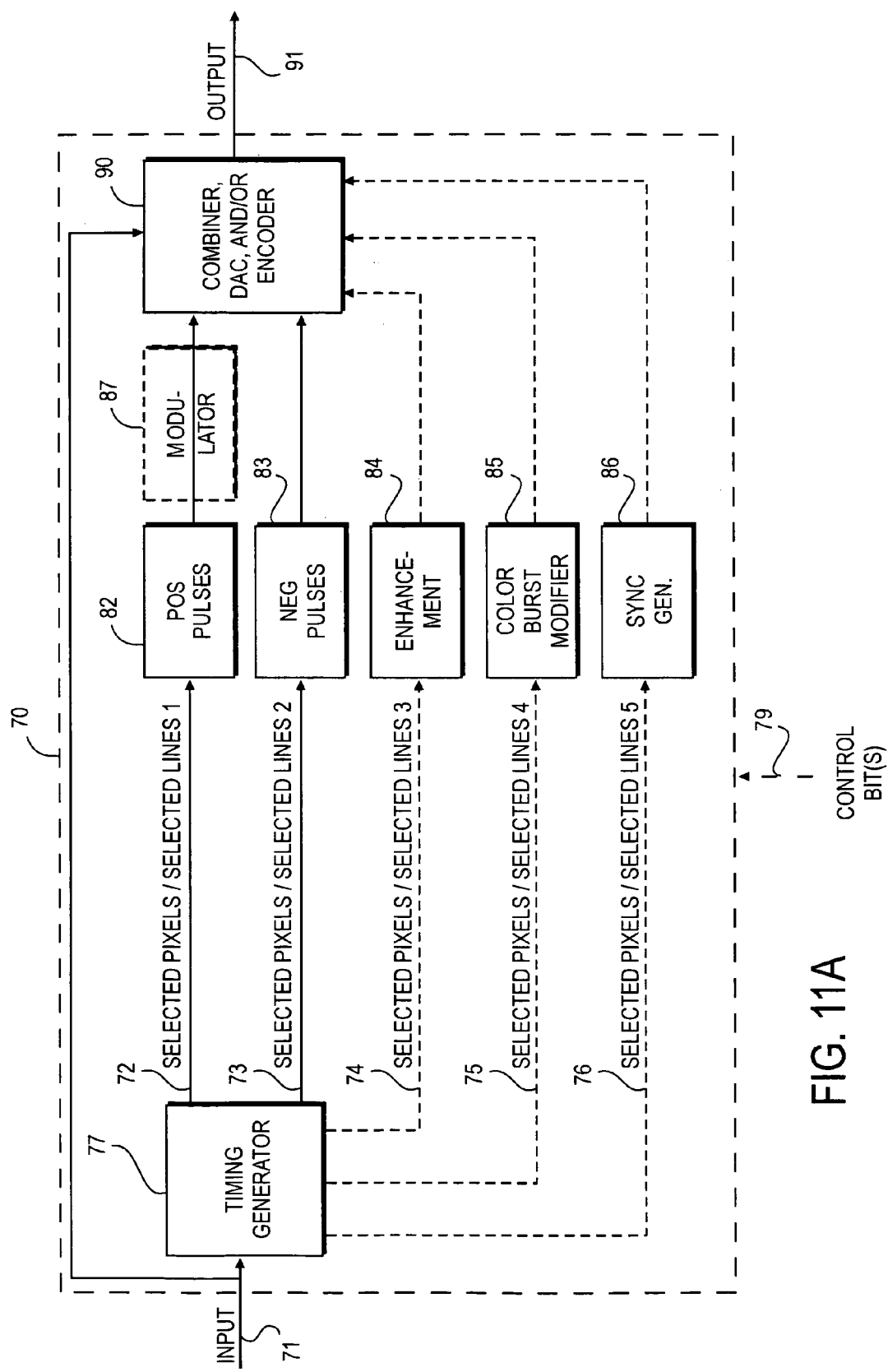
FIGS. 11A-11D illustrate examples of systems or apparatuses for one or more embodiments of the invention.

In FIG. 11A, video (analog or digital) is coupled to an input 71. A timing generator circuit 77 receives the video signal via input 71, and produces one or more various timing signals for selected pixels/selected video lines such as provided by leads 72, 73, 74, 75, and or 76.

For example, lead 72 produces a timing signal for providing positive going pulses such as AGC pulses in selected video (TV) lines and selected pixels. The timing signal on lead 72, for instance (in the VBI) can provide a logic high signal for selected pixels on (any combination of) TV lines 317 (or 6), 318 (or 7), and or up to 327 (16) for a 625 line TV standard system, which when coupled to positive pulse generator 82, provides AGC or positive going pulses to a video output 91 of combiner, DAC and or encoder circuit 90. Similarly, for a 525 TV line standard system, the video line allocation may include any combination of video lines from 10-20 and/or 272-283. Any of the positive going (e.g., AGC) pulses may be modulated in position, amplitude, and or pulse-width (e.g., within an interval or from one TV line to another) via an optional modulator circuit 87 (shown in dashed line).

For the positive going pulses, lead 72 may include providing an AGC or positive going pulse in a portion of the back porch, or a portion of a horizontal blanking interval, of selected TV lines (e.g., providing back porch pulses). For example, the selected lines may include one or more TV lines in an overscan area, such as bottom of the TV field, a portion of the VBI, and or a top of the TV field. These back porch pulses may be modulated in position, amplitude, and or pulse-width from one TV line to another via the optional modulator circuit 87. Also, amplitude modulation may be applied to one or more of the back porch pulses.

A signal for selected TV lines and pixels for providing negative going pulses for one or more embodiments of the invention, is illustrated by signal lead 73 that is coupled to a negative pulse generator 83. Generally, in the VBI, the negative going pulses may include the allocation of TV lines mentioned for signal lead 72 above. It should be noted that signal leads 72 and or 73 (via setting the selected pixels) can provide a different number of pulses, positive and or negative going pulses, a position change, and or a pulse-width change. For example, the signals can provide position modulation and or pulse width modulation of pseudo sync and or AGC pulses, from one TV line to another (e.g., in the VBI) for a video output such as on output terminal/connection 91.

Other features may be included in the negative going pulses or pseudo sync pulses that provide a copy protection signal resistant to certain black boxes. For example, an enhancement signal may be added. To this end, a selected line and or pixel signal lead 74, may provide an enhancement circuit 84 with an increased or modified copy protection effect via the circuit 90 and output 91. In one example, signal lead 74 provides selected lines and pixels to lower or to level shift (e.g., level shift up or down) at least a portion of the active video signal, and or level shift at least a portion of the front and or back porch region. For example, by level shifting down a portion of one or more TV line(s) lower than a black level or a blanking level compared to another portion of the TV signal, the copy protection effect or copy protection signal is modified or enhanced. In one (enhancement) example, one or more portions of one or more active field line(s) is shifted or lowered in black or blanking level compared to the blanking or black level of one or more TV lines in a portion of the VBI.

Another signal modification that may be included with the one or more embodiments mentioned, that provide content control or copy protection and or resistance to certain black boxes, is the color burst phase or amplitude modification for selected TV lines. This color burst modification may include segmentation of phases and or amplitudes for providing a modified color burst in one or more horizontal blanking interval(s). Thus, the timing generator 77 provides a signal on signal lead 75 that allows selected lines and pixels to be modified such that a modified color burst is synthesized via a color burst modifier circuit 85 and circuit 90. Circuit 85 receives a signal on lead 75 to generate a modified color burst for selected lines and portion of the horizontal blanking interval (HBI). The output of circuit 85 may include an analog signal or digital signal.

For example, if the input 71 is analog, the output of circuit 85 may include a color subcarrier generator, which provides a PAL or NTSC modified color burst on selected TV lines and generally normal color burst on another set of TV lines. Should input 71 include a digital signal, circuit 85 may output digital signals to a digital color (subcarrier) encoder such as one that would be included in circuit 90 to provide a color burst signal at output 91 that is modified for one set of TV lines and substantially normal color burst on another set of TV lines. The digital color (subcarrier) encoder may provide component video signals (e.g., R-Y, B-Y, I, or Q signals), which are modified in selected TV lines and pixels (e.g., in an HBI portion) to a color subcarrier encoder. The encoder encodes a modified PAL and or NTSC color burst signal such as, for example, color stripe, split burst color stripe, segmented phase/amplitude color burst signal, widened or narrowed color burst or color stripe envelope, and or advanced or delayed color burst or color stripe signal.

Yet another signal modification that may be included with the one or more embodiments mentioned, that provides content control or copy protection and or resistance to certain black boxes, is sync amplitude or position or pulse width or level shift modification for selected TV lines. A signal lead 76 provides a logic signal for selected lines and pixels to generate sync pulses of amplitude, position, level shifting, and or pulse-width via sync a generator circuit 86. In some instances, the copy protection or copy protection effect may be increased in effectiveness or modified via sync amplitude reduction and or sync width reduction on one or more TV lines. The output of circuit 86 is then coupled to the circuit 90 to provide a TV signal with one or more modified horizontal and or vertical sync pulse/signal.

Shown in dotted lines in the system 70, is (optionally) an input of one or more control bit(s) or bit pattern on a lead 79 that allows turning the system on or off. For example, the input on lead 79 may provide one or more waveforms such as a negative going pulse, a positive going pulse, an enhancement or modification signal (level shifting one or more portions of a video signal), color burst modification, and or sync modification, or may provide configuring/enabling/disabling the negative and or positive going pulses, or may configure/program/enable/disable an enhancement signal, color burst signal, and or sync signals.

Figure 11B:
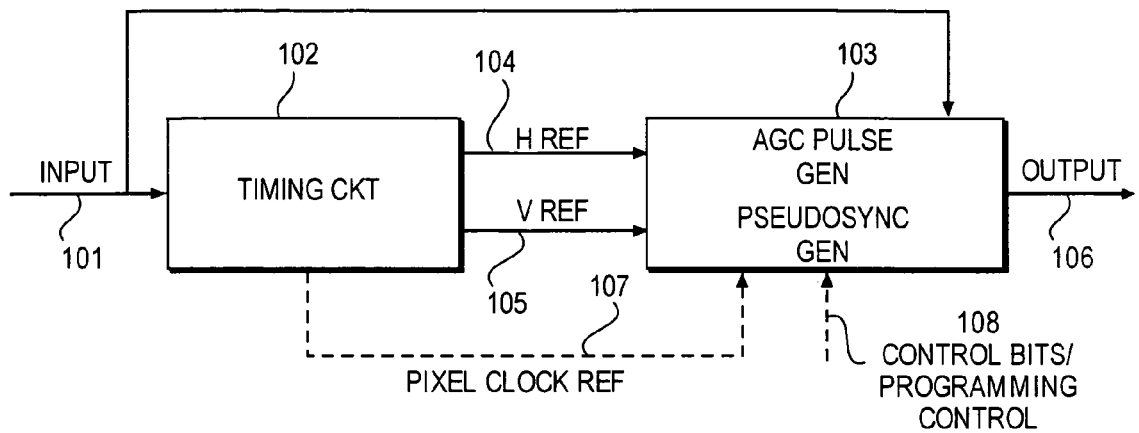

FIG. 11B illustrates another apparatus, which receives an analog or digital signal at input 101. The input 101 is coupled to a timing circuit 102, which outputs horizontal and vertical reference signals 104 and 105 respectively. These reference signals 104 and 105 are then coupled to a pseudo sync pulse generator and AGC pulse generator circuit 103. The timing circuit 102 may also provide a pixel clock reference 107 to the circuit 103. The reference timing signals and also the input signal are coupled to circuit 103 which then provides a video signal with pseudo sync pulses and or AGC pulses at an output 106 that causes certain black boxes to pass at least some of the pseudo sync or pseudo sync and AGC pulses. By causing the black box to pass at least some of the copy protection pulses, an effective copy protection or content control signal is provided at the output of the (certain) black boxes, which is contrary to the design goal or intent of the black box or circumvention device. Circuit 103 may include control or programming from one or more control or programming signals or bit(s) or bit pattern(s) as depicted at an input 108. For example, in response to a control signal, control bit, or bit pattern 108, line location, pulse width, pulse position, and or amplitude of pseudo sync and or AGC pulses may be set as by one or more bit pattern(s). A control signal or control bit may enable/disable and or program any of the inventive waveforms and or any other waveform (e.g., enhancement signal, color burst modification, sync modification, etc.) that may be combined with an embodiment of the invention.

Figure 11C:
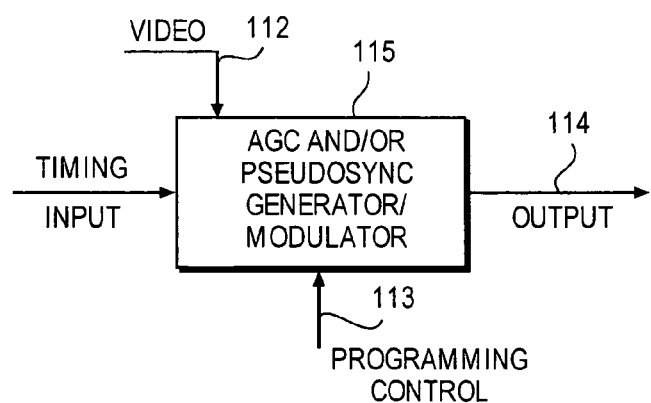

FIG. 11C illustrates a processor (circuit) 115 supplied with an input video signal on line 112 (analog or digital) and a timing signal on a line 116. Processor 115 includes a generator and or modulator. The modulator may modulate pulse width, pulse position, gap width such as between a negative going pulse and a positive going pulse, and or may modulate the amplitude of AGC pulses and or sync/pseudo sync pulses. For example, with the pseudo sync/AGC line locations that cause a black box to become ineffective, the pseudo sync and or AGC pulses may be position or pulse width modulated within a video line or from one video line to another. The copy protection pulses such as AGC pulses may include amplitude modulation. An example output of processor 115 is a signal on output 114, which may include static or dynamically modulated copy protection waveform(s), which defeats or reduces one or more effects of a black box, which provides resistance to certain black boxes and or which improves on playability. Processor 115 may (also) include an enabling, disabling, and or programmability (control) bit or signal on an input 113 such as previously mentioned for example in FIG. 11A and or FIG. 11B.

Figure 11D:
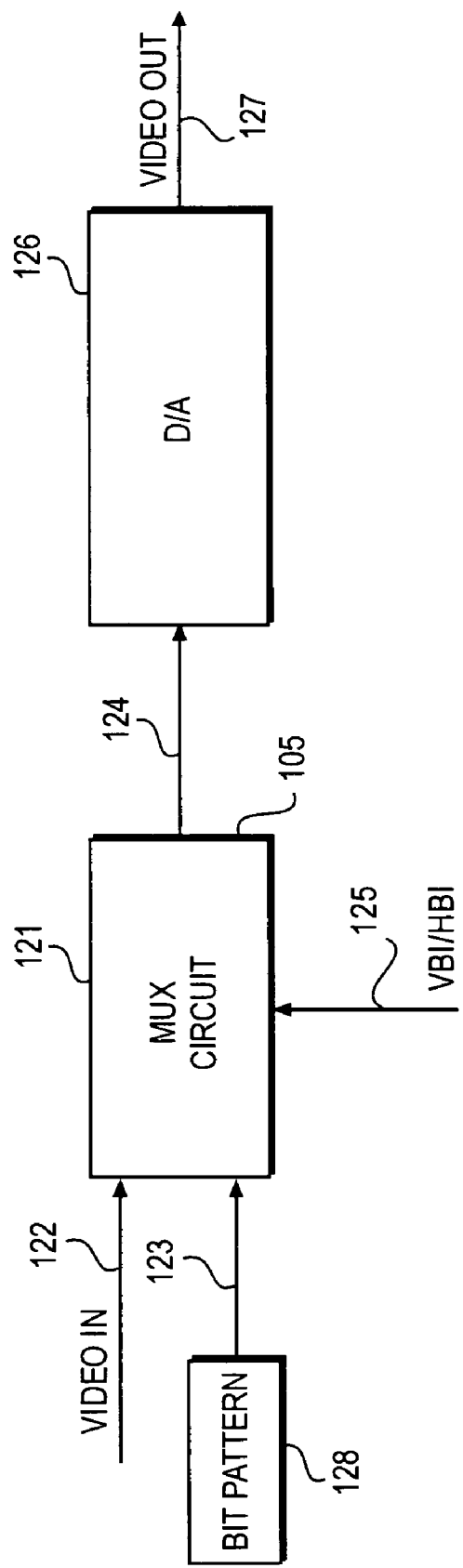

FIG. 11D illustrates an apparatus for use in the digital domain. A digital video signal is coupled to an input 122 of a switching or multiplex (MUX) circuit 121. Another input 123 supplies a bit pattern signal from a bit pattern generator 128, which provides digital words or bytes (or a bit pattern) that switch in various levels to provide negative going and or positive going pulses at an output 127 of a digital to analog converter 126. The circuit 121 also is supplied with a switch or multiplex control signal on an input 125, which is enabled during one or more portions of the VBI and or HBI. For example, during a portion of the VBI, such as immediately after (or up to one line delayed after) a vertical sync signal or equalizing pulse, the bit pattern generator 128 is switched in by the control input 125. Generator/source 128 provides a digital signal such that when circuit 121 is coupled to the digital to analog converter (D/A) 126, pseudo sync and or AGC pulses are provided to the video signal on input 122 with one or more pseudo sync pulses and or AGC pulses from zero to about 1.5 TV line(s) after a post equalizing pulse or after a vertical sync signal, wherein the vertical sync signal includes pre-equalizing syncs, broad sync pulses, and post equalizing syncs. When a portion of the HBI is enabled or turned active, generator 128 can provide a bit pattern which provides an AGC pulse (and/or negative going pulse) in a portion of the back porch, or HBI of selected TV lines on the video output 127.

A summary of at least one or more embodiment(s) of the invention is as follows:

1) A method of providing a video copy protection signal to a video signal to form a copy protected video signal which causes a circumvention device to pass at least some of the video copy protection signal at the output of the circumvention device. The method includes inserting or adding, in at least one TV line, one or more pseudo sync pulses, or one or more pseudo sync pulse/AGC pulse pair signals immediately after a vertical sync signal, or delayed one line or delayed less than 2 lines after a vertical sync signal. It follows that the copy protected video signal is substantially effective in providing copy protection or content control after passing through the circumvention device, contrary to the intended function of the circumvention device.

2) Wherein at least one TV line with one or more pseudo sync pulse and or AGC pulse, includes up to 18 TV lines including one or more pseudo sync pulse and or AGC pulse per TV line, or wherein the number of pseudo sync and or AGC pulses changes from one TV line to another TV line.

3) Wherein the copy protected video signal is a composite, component, PAL, or NTSC or SECAM copy protected video signal, or wherein horizontal sync(s), the pseudo sync(s), and or AGC signal(s) are position, pulse-width, and or amplitude modulated from one TV line to another TV line, or within a TV line.

4) Wherein the circumvention device adds or enhances copy protection effectiveness after processing the copy protected signal.

5) Wherein the circumvention device further blanks a portion of the active video field.

6) Wherein the circumvention device further blanks out color burst signals in one or more TV lines in the active TV field.

7) Wherein one or more TV lines in the active TV field exhibit color distortion via the circumvention device.

8) Wherein the copy protected signal includes improved playability over a copy protected video signal which inserts pseudo sync pulses two or more lines after the vertical sync signal.

9) An apparatus for providing a video copy protection signal to a video signal to form a copy protected video signal which causes a circumvention device to pass at least some of the video copy protection signal at the output of the circumvention device. The apparatus includes a processing circuit receiving a video signal, for inserting or adding one or more pseudo sync pulses or pseudo sync/AGC pulse pair signals in at least one TV line immediately after, or one line or less than 2 lines after, a vertical sync signal, to provide the copy protected video signal.

As mentioned previously, the invention involves providing a copy protection signal including pseudo sync and AGC pulses for a pulse pair signal, wherein a location of the pseudo sync pulses provides resistance to a circumvention device and wherein the circumvention devices passes at least one pulse pair signal, and wherein the location of pseudo sync signals start immediately after or less than 2 or 2.5 lines after a vertical sync signal. The invention includes one or more of the following: a color burst modification of whole or segmented sections of one or more color burst envelope which includes one or more cycles of incorrect color burst, level shifting a portion of the video signal including lowering or raising one or more portions of the video signal, modifying sync location, amplitude, and or pulse width at selected TV lines, providing back porch pulses of different video levels from one line to another, providing pseudo sync and or AGC pulses of different pulse widths from one line to another, providing pseudo sync and or AGC pulses of different numbers from one line to another.

The invention includes providing a copy protection signal, wherein the copy protection signal causes a circumvention device to modify the video signal so as to increase copy protection effectiveness while passing at least part of the copy protection signal to maintain copy protection effectiveness from the copy protection signal. The increased effectiveness provided by the circumvention device includes modifying one or more color burst signals to cause new color distortion and or blanking/modifying a portion of the visible view area, by starting the copy protection signals immediately after or less than 2 or 2.5 lines after a vertical sync signal.

In terms of chroma effects, the invention includes increasing color copy protection effects of a copy protection signal provided by a circumvention device, wherein the copy protection signal includes color burst modification in selected TV lines, and wherein the color burst modification causes a recorder or TV set to produce color distortion. The invention includes combining pseudo sync and or pseudo sync and or AGC pulses immediately after or less than 2 or 2.5 lines after a vertical sync signal with the color burst modification, wherein the color burst modification includes cycles of incorrect phase or frequency in selected TV lines, and wherein the circumvention device outputs a copy protection signal which produces color distortions of the modified color burst in the copy protection signal and extra color distortion due to blanking or modifying color burst envelopes in an active field caused by the circumvention device. For example, the circumvention device senses the pseudo sync signals to cause incorrect blanking or modification of the copy protection signal, which may include passing some or all of the pseudo sync and or AGC signals to the output of the circumvention device.

Circuitry for any of the above embodiments, methods, and or apparatuses may be included in an integrated circuit or part of an integrated circuit. Media players, tuners, optical storage players or recorders, hard drive or magnetic storage players or recorders, solid state memory recorders or players, receivers, recorders, cell phones, TV sets, etc. may include the integrated circuit or circuitry to provide at least a part of any of the inventive waveforms or embodiments, that, for example, provide resistance to certain circumvention devices and or improve playability, such as, for example, over prior art copy protection signals such as in terms of improving playability via less hooking or via less scanning error on a TV display.

What is claimed is:

1. A method of providing a video copy protection signal for a video signal by causing a copy protection signal circumvention device to fail in removing the video copy protection signal at its output, wherein a vertical sync signal includes a pre-equalizing pulse interval, a vertical sync pulse interval and a post-equalizing pulse interval, wherein the circumvention device does remove a standard video copy protection signal which includes pseudo sync pulses starting at least two video lines after the post-equalizing pulse interval of the vertical sync signal, and wherein the video copy protection signal is coupled to an input of the circumvention device, comprising:
   inserting or adding via a circuit in at least one TV line in the video signal one or more pseudo sync pulse or one or more pseudo sync pulse/AGC pulse pair signal less than two TV lines after the post-equalizing pulse interval of the vertical sync signal; and
   providing a copy protected video signal as the result of the circumvention device's failure to remove the video copy protection signal coupled to its input, wherein the output of the circumvention device provides the copy protected video signal.

2. The method of claim of claim 1 wherein the at least one TV line includes up to 18 TV lines.

3. The method of claim 1 wherein the copy protected video signal is a PAL or NTSC or SECAM copy protected video signal.

4. The method of claim 1 wherein the circumvention device adds or enhances copy protection effectiveness after processing the copy protected signal.

5. The method of claim 1 wherein the circumvention device further blanks a portion of the active video field.

6. The method of claim 1 wherein the circumvention device further blanks out color burst signals in one or more TV lines in the active TV field.

7. The method of claim 6 wherein one or more TV lines in the active TV field exhibit color distortion.

8. The method of claim 1 wherein the copy protected signal includes improved playability over a copy protected video signal which starts inserting pseudo sync pulses 2 or more lines after the vertical sync signal.

9. A method of providing a copy protection signal of improved playability in a video signal, wherein the copy protection signal includes pseudo sync signals, and wherein the video signal includes vertical sync signals comprised of a pre-equalizing pulse interval, a vertical sync pulse interval and a post-equalizing pulse interval, comprising:
   providing in television (TV) lines via a circuit pseudo sync signals which are located less than two TV lines after the post-equalizing pulse interval of the vertical sync signal, wherein the pseudo sync signals cause less scanning errors on a TV set; and
   providing the copy protection signal of improved playability as caused by a circumvention device's failure to remove the copy protection signal coupled to an input of the circumvention device.

10. The method of claim 9 wherein the pseudo sync signals have a different number of pseudo sync pulses from one line to another or a different pseudo sync pulse width from one line to another line.

11. A method of providing improved playability of a copy protection signal, wherein the copy protection signal includes pseudo sync pulses, comprising:
   providing via a circuit a different number of pseudo sync pulses from one video line to another line or different pseudo sync pulse widths from one video line to another, or both a different number and different pulse widths of pseudo sync pulses from one video line to another; and
   generating via the circuit at least two lines consecutively with the same number of pseudo sync pulses or the same pseudo sync pulse widths, or both the same number and pulse widths from one video line to another;
   wherein the playability is improved when compared with a copy protection signal that has a different number or a different width of pseudo sync pulses from one video line to another; and
   wherein the copy protection signal maintains the copy protection effectiveness while providing the improved playability.

12. A method of providing a copy protection signal for a video signal having pseudo sync and automatic gain control (AGC) pulses defining a pulse pair signal, wherein the video signal includes vertical sync signals having a pre-equalizing pulse interval, a vertical sync pulse interval and a post-equalizing pulse interval, comprising:

inserting or adding via a circuit the pseudo sync pulses at a location in the video signal which provides resistance to a circumvention device and wherein the circumvention device passes at least one pulse pair signal;

starting the pseudo sync signals less than 2 TV lines after the post-equalizing pulse interval of the vertical sync signal; and the method including circuitry for providing one or more of the following; a color burst modification of whole or segmented portions of one or more color burst envelope which includes one or more cycle of incorrect color burst, level shifting of a portion of the video signal including lowering or raising one or more portions of the video signal, modifying sync location, amplitude, or pulse width in selected video lines, providing back porch pulses of different video levels from one video line to another, providing pseudo sync or AGC pulses of different pulse widths from one video line to another, providing pseudo sync or AGC pulses of different numbers from one video line to another;

wherein an output of the circumvention device provides the at least one pulse pair signal and thus an effective copy protection signal.

13. A method of providing a video copy protection signal for a video signal, wherein the video signal includes vertical sync signals having a pre-equalizing pulse interval, a vertical sync pulse interval and a post-equalizing pulse interval, comprising:

providing via a circuit the copy protection signal to a circumvention device which maintains copy protection effectiveness of the video signal by passing at least part of the copy protection signal;

wherein the maintained effectiveness caused by the circumvention device includes modifying one or more color burst signal to cause added color distortion or to cause the blanking of a portion of the visible view area; and inserting or adding via a circuit the copy protection signal less than two video lines after the post-equalizing pulse interval of the vertical sync signal to cause the circumvention device to fail in removing, and thus to maintain, the video copy protection signal.

14. A method of increasing color copy protection effects of a copy protection signal, the effects caused by a circumvention device, wherein a video signal includes vertical sync signals having a pre-equalizing pulse interval, a vertical sync pulse interval, and a post-equalizing pulse interval, wherein the copy protection signal includes color burst modification in selected video lines, and wherein the color burst modification causes a recorder to produce color distortion, comprising:

combining pseudo sync or pseudo sync and automatic gain control (AGC) pulses less than two video lines after the post-equalizing pulse interval of the vertical sync signal, with the color burst modification;

wherein the color burst modification includes cycles of incorrect phase or frequency in selected video lines; and wherein the circumvention device outputs a copy protection signal which produces the color distortion in the modified color burst of the copy protection signal and extra color distortion due to blanking or modifying of color burst envelopes in an active video field, wherein the color distortions are caused by the failure of the circumvention device to remove them.

15. A method of providing a video copy protection signal utilizing pseudo sync or pseudo sync and AGC pulses, while improving playability, comprising:

providing via a circuit pseudo sync pulses and AGC pulses to form pulse pair signals in a portion of a vertical blanking interval in a video signal, wherein the number of pseudo sync and AGC pulses alternates from one video line to a next video line, and wherein there is at least two adjacent lines that have a different number of pseudo sync and AGC pulses;

wherein to improve playability on a TV monitor at least the last two video lines are provided with the same number of pseudo sync and AGC pulses which causes the video copy protection signal to be improved in playability in terms of reducing hooking that is viewable on a top portion of the TV monitor display when compared with a copy protection signal that has alternating numbers of pseudo sync pulses from one video line to another;

wherein the video signal includes a vertical sync signal having a post-equalizing pulse interval;

starting the copy protection pulses less than two video lines after the post-equalizing pulse interval of the vertical sync signal; and wherein the playability is further improved by the circumvention device's failure to remove the copy protection signal.

16. The method of claim 15 wherein the video copy protection signal occupies at least three video lines including two adjacent video lines with a different number of pseudo sync pulses per line, and including two consecutive video lines with the same number of pseudo sync pulses per line.

17. Apparatus for providing a video copy protection signal with improved playability, comprising:

a circuit for providing a number of pseudo sync pulses, or pseudo sync and automatic gain control (AGC) pulses, which number alternates from one video line to another video line, and wherein there is at least two adjacent video lines that have a different number of pseudo sync or pseudo sync and AGC pulses;

wherein the circuit for providing provides at least two video lines of the video copy protection signal with the same number of pseudo sync pulses or pseudo sync and AGC pulses, to provide the video copy protection signal of improved playability while also providing video copy protection on a video recorder; and wherein the playability of the latter copy protected signal displayed on a television monitor is improved in terms of reducing hooking that is viewable on a top portion of the display when compared to a copy protection signal that has an alternating number of pseudo sync or pseudo sync and AGC pulses from one video line to another.

18. A method of providing a video copy protection signal with improved playability of a video signal, comprising:

providing via a circuit a number of pseudo sync and AGC pulses, which number alternates from one video line to a next line, and wherein there is at least two adjacent video lines that have a different number of pseudo sync and AGC pulses;

providing via a circuit pseudo sync pulses and AGC pulses to form pulse pair signals in a portion of the vertical blanking interval, wherein at least the last two lines are provided with the same number of pseudo sync and AGC pulses to provide a copy protection effect on a video recorder and to improve playability on a TV monitor;

wherein the video signal includes a vertical sync signal having a post-equalizing pulse interval;

starting the copy protection pulses less than two video lines after the post-equalizing pulse interval of the vertical sync signal, to cause the circumvention device to fail to remove the copy protection signal; and wherein the video copy protection signal is improved in playability in terms of reducing hooking that can be viewable on a top portion of the TV monitor display when compared with a copy protection signal that has alternating numbers of pseudo sync pulses from one video line to another and in the last two video lines.

19. The method of claim 18 wherein the video copy protection signal occupies at least three TV lines including two adjacent lines with different number of pseudo sync pulses per line and including two consecutive lines with the same number of pseudo sync pulses per line.

20. An apparatus for providing a video copy protection signal for a video signal by causing a copy protection signal circumvention device to fail in removing the video copy protection signal supplied at its output, wherein a vertical sync signal includes a pre-equalizing pulse interval, a vertical sync pulse interval and a post-equalizing pulse interval, wherein the circumvention device does remove a standard copy protection signal which includes pseudo sync pulses starting at least two video lines after the post-equalizing pulse interval of the vertical sync signal, and wherein the video copy protection signal is coupled to an input of the circumvention device, the apparatus comprising:

a processing circuit receiving the video signal for inserting or adding one or more pseudo sync pulse or one or more pseudo sync/AGC pulse pair signals in at least one TV line of the video signal less than two lines after the post-equalizing pulse interval of the vertical sync signal; and wherein the circumvention device receives the video copy protection signal and provides a copy protected video signal as the result of the circumvention device's failure to remove the video copy protection signal coupled to its input, wherein the output of the circumvention device provides the copy protected video signal.

21. A method of providing a content control or video copy protection signal for a video signal in a 525 line standard, by causing a copy protection signal circumvention device to fail in removing the content control or video copy protection signal at its output, wherein a vertical sync signal includes a pre-equalizing pulse interval, a vertical sync pulse interval and a post-equalizing pulse interval, wherein the circumvention device does remove a standard video copy protection signal which includes pseudo sync pulses starting at least two TV lines after the post-equalizing pulse interval of the vertical sync signal, and wherein the content control or video copy protection signal is coupled to an input of the circumvention device, comprising:

inserting or adding via a circuit in at least one TV line in the video signal one or more pseudo sync pulse or one or more pseudo sync pulse/AGC pulse pair signals starting at TV lines 10, 11, 272 or 273 after the post-equalizing pulse interval of the vertical sync signal in the 525 line standard; and providing a content controlled or copy protected video signal as the result of the circumvention device's failure to remove the content control or video copy protection signal coupled to its input, wherein the output of the circumvention device provides the content controlled or copy protected video signal.

22. An apparatus for providing a content control or video copy protection signal for a video signal in a 525 line standard, by causing a copy protection signal circumvention device to fail in removing the content control or video copy protection signal at its output, wherein a vertical sync signal includes a pre-equalizing pulse interval, a vertical sync pulse interval and a post-equalizing pulse interval, wherein the circumvention device does remove a standard video copy protection signal which includes pseudo sync pulses starting at least two TV lines after the post-equalizing pulse interval of the vertical sync signal, and wherein the content control or video copy protection signal is coupled to an input of the circumvention device, comprising:

a processing circuit for inserting or adding in at least one TV line in the video signal one or more pseudo sync pulse or one or more pseudo sync pulse/AGC pulse pair signals starting at TV lines 10, 11, 272 or 273 after the post-equalizing pulse interval of the vertical sync signal in the 525 line standard; and a circuit for providing a content controlled or copy protected video signal as the result of the circumvention device's failure to remove the content control or video copy protection signal coupled to its input, wherein the output of the circumvention device provides the content controlled or copy protected video signal.

* * * * *

UNITED STATES PATENT AND TRADEMARK OFFICE
CERTIFICATE OF CORRECTION

PATENT NO. : 8,280,049 B2  
APPLICATION NO. : 12/322004  
DATED : October 2, 2012  
INVENTOR(S) : Ronald Quan Page 1 of 1

It is certified that error appears in the above-identified patent and that said Letters Patent is hereby corrected as shown below:

On the Title page, Item (60) insert

--Related U.S. Application Data

(60) Provisional application No. 61/190,254, filed on August 27, 2008.--

Signed and Sealed this  
Twenty-fifth Day of December, 2012

David J. Kappos  
*Director of the United States Patent and Trademark Office*